US011481313B2

(12) United States Patent
Stump et al.

(10) Patent No.: US 11,481,313 B2
(45) Date of Patent: *Oct. 25, 2022

(54) TESTING FRAMEWORK FOR AUTOMATION OBJECTS

(71) Applicant: Rockwell Automation Technologies, Inc., Mayfield Heights, OH (US)

(72) Inventors: Andrew R Stump, Mentor, OH (US); Anthony Carrara, Strongsville, OH (US); Eashwer Srinivasan, Fremont, CA (US); Christopher W Como, Chagrin Falls, OH (US); Sharon M Billi-Duran, Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,896

(22) Filed: Jun. 7, 2021

(65) Prior Publication Data

US 2021/0294734 A1 Sep. 23, 2021

Related U.S. Application Data

(63) Continuation of application No. 16/584,368, filed on Sep. 26, 2019, now Pat. No. 11,080,176.

(51) Int. Cl.
 *G06F 11/36* (2006.01)
(52) U.S. Cl.
 CPC ...... *G06F 11/3688* (2013.01); *G06F 11/3664* (2013.01); *G06F 11/3684* (2013.01)
(58) Field of Classification Search
 CPC ............. G06F 11/3688; G06F 11/3664; G06F 11/3684
 See application file for complete search history.

(56) References Cited

U.S. PATENT DOCUMENTS 5,526,522 A 11/1996 Takeuchi
6,516,451 B1 2/2003 Patin
(Continued)

FOREIGN PATENT DOCUMENTS

CN 105159656 A 12/2015
CN 107463147 A 12/2017
(Continued)

OTHER PUBLICATIONS

Extended European Search Report received for EP Patent Application Serial No. 20167073.4 dated May 28, 2020, 11 pages.
(Continued)

*Primary Examiner* — Anna C Deng
(74) *Attorney, Agent, or Firm* — Amin, Turocy & Watson, LLP

(57) ABSTRACT

An industrial integrated development environment (IDE) supports a testing framework that verifies operation of all aspects of the project (e.g., controller code, HMI screens or other visualizations, panel layouts, wiring schedules, etc.). As part of this testing framework, automation objects supported by the industrial IDE include associated test scripts designed to execute one or more test scenarios appropriate to the type of automation object or project being tested. Test scripts can also be associated with portions of the system project. The testing platform applies testing to the automation project as a whole in a holistic manner rather than to specific portions of a control program, verifying linkages across design platforms (e.g., control code, visualization, panel layouts, wiring, piping, etc.) that may otherwise not be tested.

20 Claims, 19 Drawing Sheets

(56) References Cited

U.S. PATENT DOCUMENTS

| | | | |
|---|---|---|---|
| 6,993,745 | B1 | 1/2006 | Ballantyne et al. |
| 7,313,609 | B1 | 12/2007 | Wischinski |
| 8,667,456 | B1 | 3/2014 | Czymontek |
| 8,812,684 | B1 | 8/2014 | Hood et al. |
| 9,223,567 | B2 | 12/2015 | DeLuca et al. |
| 10,372,107 | B2 | 8/2019 | Majewski et al. |
| 10,503,632 | B1 | 12/2019 | Sivanantham et al. |
| 10,559,043 | B1 | 2/2020 | Schlintl |
| 10,606,576 | B1 | 3/2020 | Tung et al. |
| 10,761,810 | B2 | 9/2020 | Ramakrishna et al. |
| 10,832,187 | B2 | 11/2020 | Sharma et al. |
| 10,936,807 | B1 | 3/2021 | Walters et al. |
| 11,048,500 | B2 | 6/2021 | Grant et al. |
| 11,087,053 | B1 | 8/2021 | Sha et al. |
| 11,107,236 | B2 | 8/2021 | Hansson |
| 2002/0191023 | A1 | 12/2002 | Chandhoke et al. |
| 2003/0009250 | A1 | 1/2003 | Resnick et al. |
| 2003/0028364 | A1 | 2/2003 | Chan et al. |
| 2004/0073404 | A1 | 4/2004 | Brooks et al. |
| 2004/0088688 | A1 | 5/2004 | Hejlsberg et al. |
| 2005/0257203 | A1* | 11/2005 | Nattinger ............ G06F 11/323 717/113 |
| 2005/0268288 | A1* | 12/2005 | Nattinger ............ G06F 8/34 717/125 |
| 2006/0041440 | A1 | 2/2006 | Cheng et al. |
| 2006/0224534 | A1 | 10/2006 | Hartman et al. |
| 2007/0016309 | A1 | 1/2007 | Mckelvey et al. |
| 2007/0282766 | A1 | 12/2007 | Hartman et al. |
| 2008/0022259 | A1 | 1/2008 | Macklem et al. |
| 2008/0092131 | A1 | 4/2008 | Mcintyre et al. |
| 2008/0235166 | A1 | 9/2008 | Sayyar-Rodsari et al. |
| 2009/0064103 | A1 | 3/2009 | Shih |
| 2009/0083649 | A1 | 3/2009 | Baier et al. |
| 2009/0088875 | A1 | 4/2009 | Baier et al. |
| 2009/0089225 | A1 | 4/2009 | Baier et al. |
| 2009/0089234 | A1 | 4/2009 | Sturrock et al. |
| 2009/0276752 | A1 | 11/2009 | Sharma |
| 2010/0082133 | A1 | 4/2010 | Chouinard et al. |
| 2010/0269094 | A1 | 10/2010 | Levenshteyn et al. |
| 2011/0239198 | A1* | 9/2011 | Sweis ............ G06F 11/3692 717/135 |
| 2012/0109590 | A1 | 5/2012 | Trainer et al. |
| 2012/0212484 | A1 | 8/2012 | Haddick et al. |
| 2013/0123946 | A1 | 5/2013 | Govindaraj et al. |
| 2013/0212214 | A1 | 8/2013 | Lawson et al. |
| 2013/0218867 | A1 | 8/2013 | DeLuca et al. |
| 2013/0332212 | A1* | 12/2013 | Cohen ............ G06Q 10/0631 705/7.15 |
| 2014/0013313 | A1 | 1/2014 | Eker et al. |
| 2014/0047413 | A1 | 2/2014 | Sheive et al. |
| 2014/0096108 | A1 | 4/2014 | Austin |
| 2014/0229389 | A1* | 8/2014 | Pantaleano ............ G06Q 10/103 705/300 |
| 2014/0337277 | A1 | 11/2014 | Asenjo et al. |
| 2014/0359586 | A1 | 12/2014 | Payette et al. |
| 2015/0186119 | A1 | 7/2015 | Chouinard et al. |
| 2016/0274552 | A1 | 9/2016 | Strohmenger et al. |
| 2016/0291566 | A1 | 10/2016 | Prosak et al. |
| 2016/0330082 | A1 | 11/2016 | Bliss et al. |
| 2016/0364675 | A1 | 12/2016 | Sharma et al. |
| 2017/0103440 | A1 | 4/2017 | Xing et al. |
| 2017/0206237 | A1 | 7/2017 | Sokol et al. |
| 2017/0308052 | A1 | 10/2017 | Kajiyama |
| 2017/0329687 | A1* | 11/2017 | Chorley ............ G06F 11/263 |
| 2017/0336947 | A1 | 11/2017 | Bliss et al. |
| 2017/0357565 | A1 | 12/2017 | Ledet |
| 2018/0025286 | A1 | 1/2018 | Gorelik et al. |
| 2018/0039905 | A1 | 2/2018 | Anghel et al. |
| 2018/0052451 | A1 | 2/2018 | Billi-Duran et al. |
| 2018/0083982 | A1 | 3/2018 | Asenjo et al. |
| 2018/0129276 | A1 | 5/2018 | Nguyen et al. |
| 2018/0130260 | A1 | 5/2018 | Schmirler et al. |
| 2018/0131907 | A1 | 5/2018 | Schmirler et al. |
| 2018/0136910 | A1 | 5/2018 | Noetzelmann et al. |
| 2018/0192075 | A1 | 7/2018 | Chambers et al. |
| 2018/0197347 | A1 | 7/2018 | Tomizuka |
| 2018/0246803 | A1* | 8/2018 | Zhang ............ G06F 11/3672 |
| 2018/0357922 | A1 | 12/2018 | Dutta et al. |
| 2018/0373885 | A1* | 12/2018 | Arad ............ G06F 21/6254 |
| 2019/0012151 | A1 | 1/2019 | Holbrook et al. |
| 2019/0057548 | A1 | 2/2019 | Singh et al. |
| 2019/0079643 | A1 | 3/2019 | Kershaw et al. |
| 2019/0079740 | A1 | 3/2019 | Sharma et al. |
| 2019/0146577 | A1 | 5/2019 | Rokade et al. |
| 2019/0147655 | A1 | 5/2019 | Galera et al. |
| 2019/0188108 | A1* | 6/2019 | Jagannathan ...... G06F 11/3452 |
| 2019/0205113 | A1 | 7/2019 | Karpoff et al. |
| 2019/0220253 | A1* | 7/2019 | Pradhan ............ G06N 3/08 |
| 2019/0279132 | A1 | 9/2019 | Escriche et al. |
| 2019/0279424 | A1 | 9/2019 | Clausen et al. |
| 2019/0385342 | A1 | 12/2019 | Freeman et al. |
| 2020/0019147 | A1 | 1/2020 | Ludwig et al. |
| 2020/0019493 | A1 | 1/2020 | Ramakrishna et al. |
| 2020/0150638 | A1 | 5/2020 | Mourzine et al. |
| 2020/0175395 | A1 | 6/2020 | Kathiresan et al. |
| 2020/0285462 | A1 | 9/2020 | Sabath et al. |
| 2020/0371665 | A1 | 11/2020 | Clausen et al. |
| 2021/0011712 | A1 | 1/2021 | Grant et al. |
| 2021/0089276 | A1 | 3/2021 | Dunn et al. |
| 2021/0089278 | A1 | 3/2021 | Dunn et al. |
| 2021/0096526 | A1 | 4/2021 | Ericsson et al. |
| 2021/0096704 | A1 | 4/2021 | Ericsson et al. |
| 2021/0096827 | A1 | 4/2021 | Stump et al. |
| 2021/0294307 | A1 | 9/2021 | Onteddu et al. |
| 2021/0327303 | A1 | 10/2021 | Buras et al. |
| 2021/0327304 | A1 | 10/2021 | Buras et al. |
| 2021/0397166 | A1 | 12/2021 | SayyarRodsari et al. |
| 2021/0397171 | A1 | 12/2021 | SayyarRodsari et al. |

FOREIGN PATENT DOCUMENTS

| | | |
|---|---|---|
| CN | 108829024 A | 11/2018 |
| CN | 208314755 U | 1/2019 |
| CN | 109765836 A | 5/2019 |
| CN | 109840085 A | 6/2019 |
| EP | 1 256 861 A1 | 11/2002 |
| EP | 2 177 986 A1 | 4/2010 |
| EP | 2 801 939 A1 | 11/2014 |
| EP | 3 101 565 A1 | 7/2016 |
| EP | 3 070 548 A2 | 9/2016 |
| EP | 3 318 944 A2 | 5/2018 |
| EP | 3 376 325 A1 | 9/2018 |
| EP | 3511820 A1 | 7/2019 |
| EP | 3798768 A2 | 3/2021 |
| WO | 2008/115644 A1 | 9/2008 |
| WO | 2014/092694 A1 | 6/2014 |
| WO | 2016/053337 A1 | 4/2016 |
| WO | 2016/195690 A1 | 12/2016 |
| WO | 2019/136754 A1 | 7/2019 |

OTHER PUBLICATIONS

Iriondo et al., "Automatic Generation of the Supervisor Code for Industrial Switched-Mode Systems", IEEE Transactions on Industrial Informatics, IEEE Service Center, vol. 9, No. 4, Nov. 1, 2013, pp. 1868-1878.

Wikipedia, "Semi-supervised learning", URL: https://en.wikipedia.org/w/index.php?title=Semi-supervisedlearning&oldid=900515496, Jun. 6, 2019, pp. 1-7.

Non final office action received for U.S. Appl. No. 16/580,672 dated Oct. 1, 2020, 106 Pages.

Grundy et al.; "Generating Domain-Specific Visual Language Tools from Abstract Visual Specifications"; IEEE Transactions on Software Engineering, vol. 39, No. 4 (pp. 487-515); Apr. 2013 (Year: 2013).

Salihbegovic et al.; "Design of a Domain Specific Language and IDE for Internet of Things Applications"; 38th International Convention on Information and Communication Technology, Electronics and Microelectronics (MIPRO) (pp. 996-1001); 2015 (Year:2015).

(56) References Cited

OTHER PUBLICATIONS

Schmitt et al.; "An Evaluation of Domain-Specific Language Technologies for Code Generation"; 14th International Conference on Computational Science and Its Applications (pp. 18-26); 2014 (Year: 2014).
Dwarakanath et al.; "Accelerating Test Automation Through a Domain Specific Language"; IEEE International Conference on Software Testing, Verification and Validation (ICST) (pp. 460-467); 2017 (Year: 2017).
Preuer, Stefan; "A Domain-Specific Language for Industrial Automation"; Software Engineering 2007—Beitrage zu den Workshops—Fachtagung des GI-Fachbereichs Softwaretechnik. Gesellschaft fi.ir Informatik e. V., 2007 (Year: 2007).
Vyatkin, Valeriy; "Software Engineering in Industrial Automation: State-of-the-Art Review"; IEEE Transactions on Industrial Informatics 9.3: (pp. 1234-1249); 2013 (Year: 2013).
NetBeans IDE; Netbeans.org website [full url in ref.]; Oct. 1, 2012 (Year: 2012).
Notice of allowance received for U.S. Appl. No. 16/580,672 dated Oct. 30, 2020, 23 Pages.
Non Final office action received for U.S. Appl. No. 16/580,581 dated Oct. 20, 2020, 51 Pages.
Non Final office action received for U.S. Appl. No. 16/584,298 dated Oct. 20, 2020, 63 Pages.
Non Final office action received for U.S. Appl. No. 16/584,368 dated Nov. 18, 2020, 44 Pages.
Non Final office action received for U.S. Appl. No. 16/584,470 dated Feb. 18, 2021, 46 Pages.
European Search Report for European Application No. 20166286. 3-1224, dated Jan. 29, 2021.
Eclipse: "Using JavaScript Syntax Coloring," Mar. 5, 2019. Retrieved from internet Jan. 20, 2021. https://web.archive.org/web/20190305182138/http://www.eclipse.org:80/pdUhelp/html/using_javascript_syntax_coloring.htm.
European Search Report for European Application No. 20166776. 3-1202, dated Feb. 24, 2021.
European Search Report for European Application No. 20167085. 8-1224, dated Feb. 5, 2021.
European Search Report for European Application No. 20166772. 2-1202, dated Feb. 3, 2021.
European Search Report for European Application No. 20166680. 7-1202, dated Jan. 21, 2021.
The extended European search report received for European Application No. 20166772.2-1202, dated Apr. 23, 2021, 15 pages.
The extended European search report received for European Application No. 20166284.8-1202, dated Feb. 17, 2021, 08 pages.
Communication pursuant to Rule 69 EPC received for European Patent Application Serial No. 20166284.8 dated Apr. 7, 2021, 2 pages.
Communication pursuant to Rule 69 EPC received for European Patent Application Serial No. 20167085.8 dated Apr. 7, 2021, 2 pages.
Communication pursuant to Rule 69 EPC received for European Patent Application Serial No. 20166680.7 dated Apr. 7, 2021, 2 pages.
Communication pursuant to Rule 69 EPC received for European Patent Application Serial No. 20167073.4 dated Apr. 7, 2021, 2 pages.
Communication pursuant to Rule 69 EPC received for European Patent Application Serial No. 20166776.3 dated Apr. 7, 2021, 2 pages.
Communication pursuant to Rule 69 EPC received for European Patent Application Serial No. 20166286.3 dated Apr. 7, 2021, 2 pages.
Notice of Allowance received for U.S. Appl. No. 16/838,330 dated Dec. 20, 2021, 78 Pages.
Ewenike, S., et al., Cloud Based Collaborative Software Development: A Review, Gap Analysis and Future Directions, 2017 IEEE/ACS 14th International Conference on Computer Systems and Applications, pp. 901-909, 2017, [retrieved on Nov. 26, 2021], Retrieved from the Internet: <U RL:http://ieeexplore.ieee.org/>.
Figueiredo, M., et al., Wolf: Supporting Impact Analysis Activities in Distributed Software Development, 2012 5th International Workshop on Co-operative and Human Aspects of Software Engineering (CHASE), pp. 40-46, Jun. 2012, [retrieved on Nov. 26, 2021], Retrieved from the Internet: <U RL:http://ieeexplore.ieee.org/>.
Communication pursuant to Article 94(3) EPC received for European Patent Application Serial No. 20167073.4 dated Oct. 27, 2021, 9 pages.
Communication pursuant to Rule 69 EPC received for European Patent Application Serial No. 20166680.7 dated Nov. 30, 2021, 3 pages.
Extended European Search Report received for European Patent Application Serial No. 21165314.2 dated Aug. 18, 2021, 13 pages.
Extended European Search Report received for European Patent Application Serial No. 21165314.2 dated Oct. 11, 2021, 2 pages.
Non-Final office action received for U.S. Appl. No. 16/838,330 dated Aug. 5, 2021, 56 Pages.
Notice of Allowance received for U.S. Appl. No. 17/157,185 dated Nov. 1, 2021, 51 Pages.
Notice of Allowance received for U.S. Appl. No. 16/584,210 dated Mar. 21, 2022, 112 pages.
Zhang et al., "Design and Interaction Interface Using Augmented Reality for Smart Manufacturing", Procedia Manufacturing, vol. 26, 2018, pp. 1278-1286.
Rabah et al., "Towards Improving the Future of Manufacturing Through Digital Twin and Augmented Reality Technologies", Procedia Manufacturing, vol. 17, 2018, pp. 460-467.
Havard et al., "Digital Twin and Virtual Reality: a Co-simulation Environment for Design and Assessment of Industrial Workstations", Production & Manufacturing Research, vol. 7, No. 1, 2019, pp. 472-489.
Grajewski et al., "Application of Virtual Reality Techniques in Design of Ergonomic Manufacturing Workplaces", Procedia Computer Science, vol. 25, 2013, pp. 289-301.
Zaldfvar-Colado et al., "Mixed Reality for Virtual Assembly", 26th IEEE International Symposium on Robot and Human Interactive Communication (RO-MAN), 2017, pp. 739-744.
Coburn et al., "A Review of the Capabilities of Current Low-Cost Virtual Reality Technology and its Potential to Enhance the Design Process", Journal of Computing and Information Science in Engineering, vol. 17, Sep. 2017, pp. 031013-1-031013-1-15.
Non final office action received for U.S. Appl. No. 16/584,210 dated Aug. 30, 2021, 60 Pages.
Communication pursuant to Rule 69 EPC received for European Patent Application Serial No. 20166772.2 dated May 31, 2021, 2 pages.

* cited by examiner

INDUSTRIAL ASSET

TESTING FRAMEWORK FOR AUTOMATION OBJECTS

CROSS-REFERENCE TO RELATED APPLICATIONS

This application is a continuation of, and claims priority to, U.S. patent application Ser. No. 16/584,368, filed on Sep. 26, 2019, and entitled "TESTING FRAMEWORK FOR AUTOMATION OBJECTS," the entirety of which is incorporated herein by reference.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for developing industrial applications is provided, comprising a user interface component configured to render integrated development environment (IDE) interfaces and to receive, via interaction with the IDE interfaces, industrial design input that defines aspects of an industrial automation project; a project generation component configured to generate system project data based on the industrial design input, wherein the system project data defines a system project comprising at least one of an executable industrial control program, an industrial visualization application, or industrial device configuration data, and the system project data further comprises automation objects that represent respective industrial assets and have respective test scripts associated therewith; and a project testing component configured to execute one or more of the test scripts to facilitate validation of the system project data.

Also, one or more embodiments provide a method for developing industrial applications, comprising rendering, by a system comprising a processor, integrated development environment (IDE) interfaces on a client device; receiving, by the system via interaction with the IDE interfaces, industrial design input that defines aspects of an industrial control and monitoring project; generating, by the system, system project data based on the industrial design input, wherein the generating comprises generating at least one of an executable industrial control program, an industrial visualization application, or industrial device configuration data, and the system project data comprises automation objects that represent respective industrial assets and have associated therewith respective test scripts; and executing, by the system, one or more of the test scripts against the system project data to facilitate validation of the system project data.

Also, according to one or more embodiments, a non-transitory computer-readable medium is provided having stored thereon instructions that, in response to execution, cause a system to perform operations, the operations comprising rendering integrated development environment (IDE) interfaces on a client device; receiving, from the client device via interaction with the IDE interfaces, industrial design input that defines control design aspects of an industrial automation project; generating system project data based on the industrial design input, wherein the generating comprises generating at least one of an executable industrial control program, an industrial visualization application, or industrial device configuration data, and the system project data comprises automation objects that represent respective industrial assets and have respective test scripts associated therewith; and executing one or more of the test scripts against the system project data to facilitate validation of the system project data.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
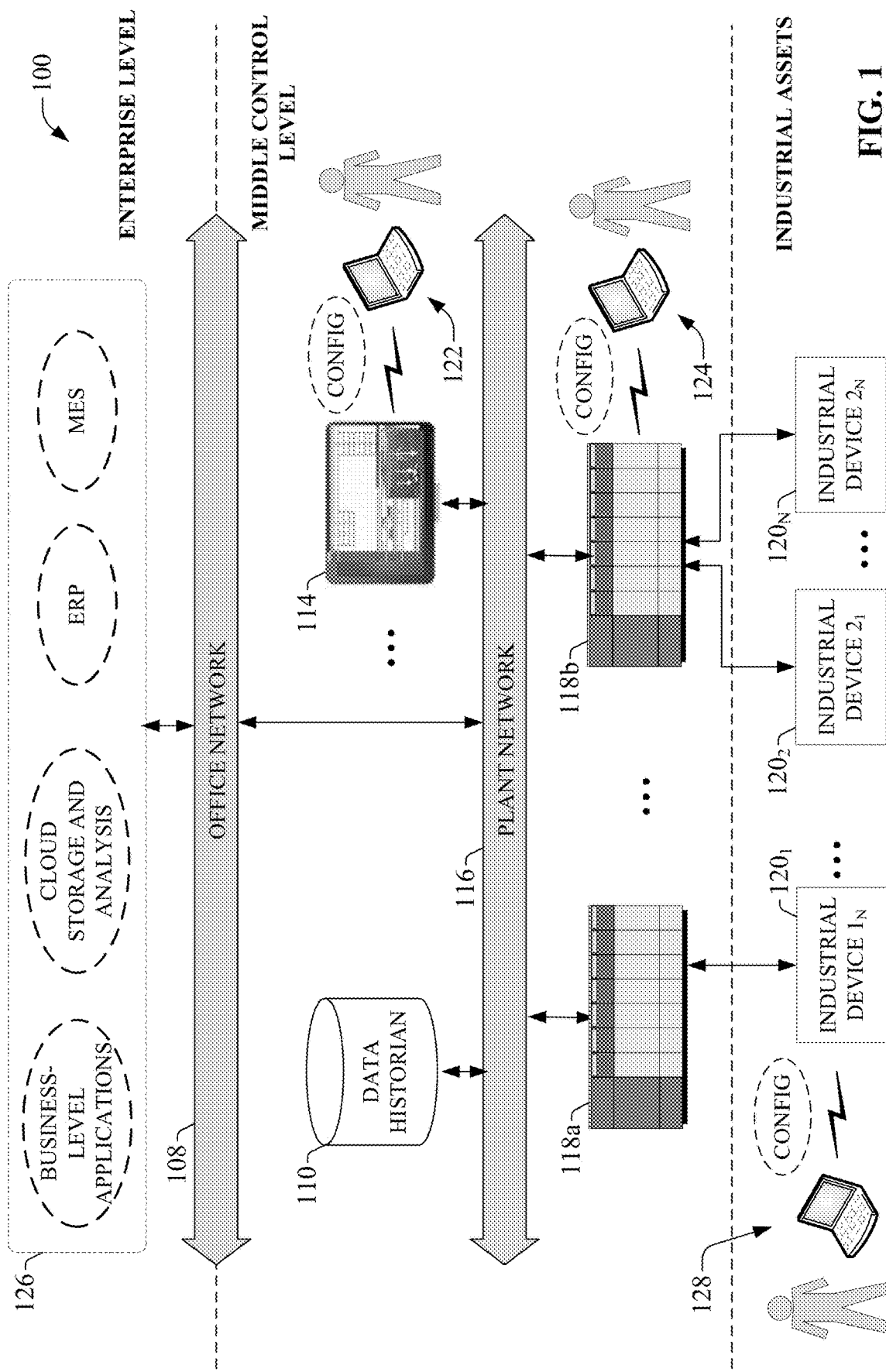
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMIs 114 using an HMI development platform (e.g., executing on client device 122) and download the resulting visualization files to the HMI 114. Some industrial devices 120—such as motor drives, telemetry devices, safety input devices, etc.—may also require configuration using separate device configuration tools (e.g., executing on client device 128) that are specific to the device being configured. Such device configuration tools may be used to set device parameters or operating modes (e.g., high/low limits, output signal formats, scale factors, energy consumption modes, etc.).

The necessity of using separate configuration tools to program and configure disparate aspects of an industrial automation system results in a piecemeal design approach whereby different but related or overlapping aspects of an automation system are designed, configured, and programmed separately on different development environments. For example, a motion control system may require an industrial controller to be programmed and a control loop to be tuned using a control logic programming platform, a motor drive to be configured using another configuration platform, and an associated HMI to be programmed using a visualization development platform. Related peripheral systems—such as vision systems, safety systems, etc.—may also require configuration using separate programming or development applications.

This segregated development approach can also necessitate considerable testing and debugging efforts to ensure proper integration of the separately configured system aspects. In this regard, intended data interfacing or coordinated actions between the different system aspects may require significant debugging due to a failure to properly coordinate disparate programming efforts.

Moreover, as part of conventional automation system project development, test scripts often have to be written to test and debug control code. For example, if control programming for a pump or other type of industrial asset is added to a project, a test script (e.g., a Python script) may be written to inject test data into the control program and assess the response. This project testing approach can be costly in terms of man-hours, since a team of people may be required to manage this manual testing and debugging and to run through all possible testing scenarios. This approach may also result in inadequately tested control code since some test scenarios may be missed (e.g., if debuggers only test selected portions of the control code), and consequently code that was ostensibly tested may not work in the field.

To address at least some of these or other issues, one or more embodiments described herein provide an integrated development environment (IDE) for designing, programming, and configuring multiple aspects of an industrial automation system using a common design environment and data model. Embodiments of the industrial IDE can be used to configure and manage automation system devices in a common way, facilitating integrated, multi-discipline programming of control, visualization, and other aspects of the control system.

In general, the industrial IDE supports features that span the full automation lifecycle, including design (e.g., device selection and sizing, controller programming, visualization development, device configuration, testing, etc.); installation, configuration and commissioning; operation, improvement, and administration; and troubleshooting, expanding, and upgrading.

Embodiments of the industrial IDE can include a library of modular code and visualizations that are specific to industry verticals and common industrial applications within those verticals. These code and visualization modules can simplify development and shorten the development cycle, while also supporting consistency and reuse across an industrial enterprise.

In some embodiments, the industrial IDE can also support a testing framework for automation that verifies operation of all aspects of the project (e.g., controller code, HMI screens or other visualizations, panel layouts, wiring schedules, etc.). As part of this testing framework, automation objects supported by the industrial IDE can include associated test scripts designed to execute one or more test scenarios appropriate to the type of automation object being tested. Test scripts can also be associated with portions of the system project. In general, the testing platform applies testing to the automation project as a whole in a holistic manner, rather than to specific portions of a control program, verifying linkages across design platforms (e.g., control code, visualization, panel layouts, wiring, piping, etc.) that may otherwise not be tested.

Figure 2:
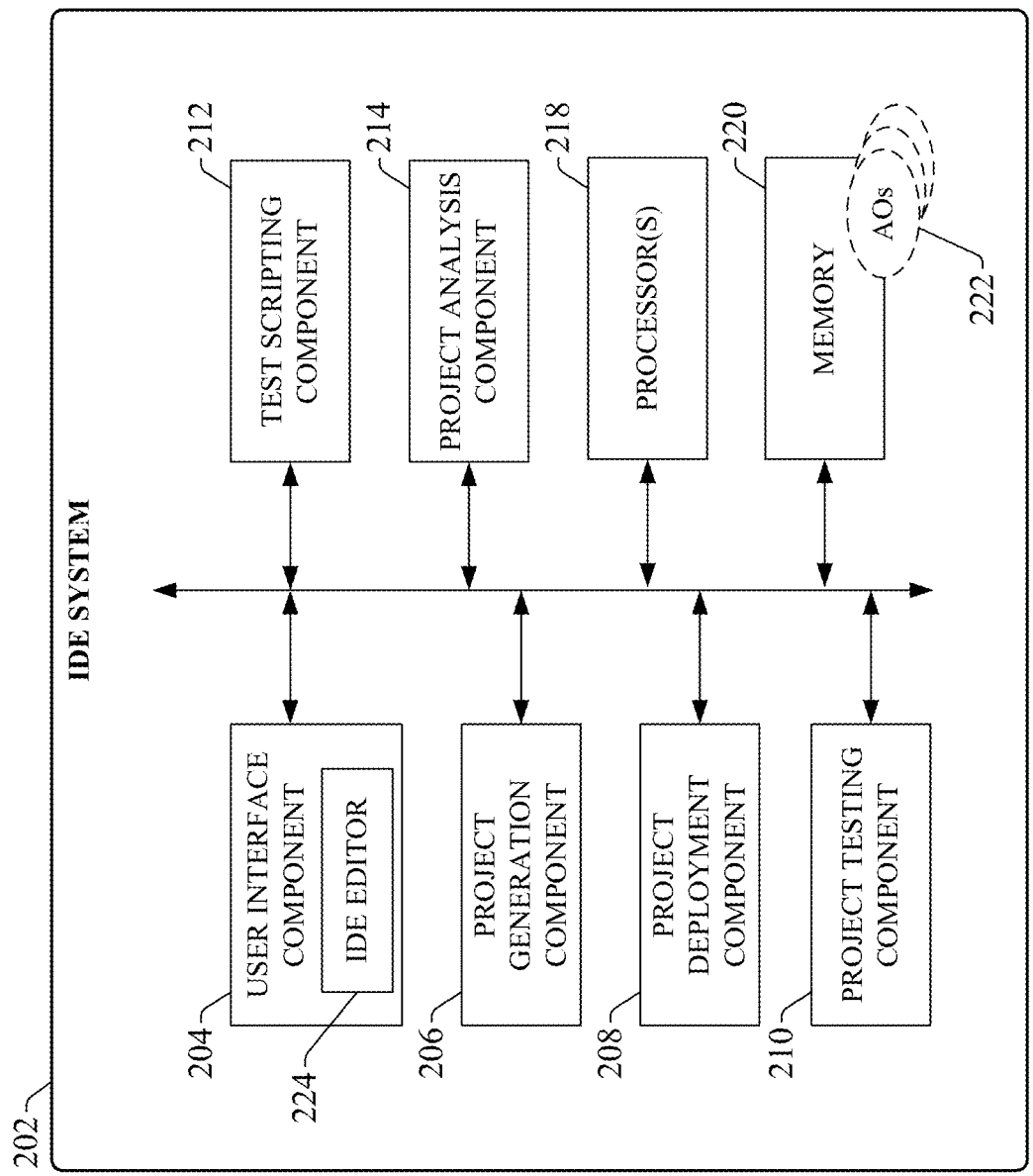
FIG. 2 is a block diagram of an example integrated development environment (IDE) system.

FIG. 2 is a block diagram of an example integrated development environment (IDE) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 202 can include a user interface component 204 including an IDE editor 224, a project generation component 206, a project deployment component 208, a project testing component 210, a test scripting component 212, a project analysis component 214, one or more processors 218, and memory 220. In various embodiments, one or more of the user interface component 204, project generation component 206, project deployment component 208, project testing component 210, test scripting component 212, project analysis component 214, the one or more processors 218, and memory 220 can be electrically and/or communicatively coupled to one another to perform one or more of the functions of the IDE system 202. In some embodiments, components 204, 206, 208, 210, 212, and 214 can comprise software instructions stored on memory 220 and executed by processor(s) 218. IDE system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with an IDE client that executes on a client device (e.g., a laptop computer, tablet computer, smart phone, etc.) that is communicatively connected to the IDE system 202 (e.g., via a hardwired or wireless connection). The user interface component 204 can then receive user input data and render output data via the IDE client. In other embodiments, user interface component 314 can be configured to generate and serve suitable interface screens to a client device (e.g., program development screens), and exchange data via these interface screens. Input data that can be received via various embodiments of user interface component 204 can include, but is not limited to, programming code, industrial design specifications or goals, engineering drawings, AR/VR input, DSL definitions, video or image data, project testing scripts, or other such input. Output data rendered by various embodiments of user interface component 204 can include program code, programming feedback (e.g., error and highlighting, coding suggestions, etc.), programming and visualization development screens, project testing results, etc.

Project generation component 206 can be configured to create a system project comprising one or more project files based on design input received via the user interface component 204, as well as industrial knowledge, predefined code modules and visualizations, and automation objects 222 maintained by the IDE system 202. Project deployment component 208 can be configured to commission the system project created by the project generation component 206 to appropriate industrial devices (e.g., controllers, HMI terminals, motor drives, AR/VR systems, etc.) for execution. To this end, project deployment component 208 can identify the appropriate target devices to which respective portions of the system project should be sent for execution, translate these respective portions to formats understandable by the target devices, and deploy the translated project components to their corresponding devices.

Project testing component 210 can be configured to execute testing scripts associated with automation objects 222 or other elements of the system project to validate proper execution of various aspects of the project. Test scripting component 212 can be configured to add or modify custom test scripts in accordance with user input and associate these test scripts with indicated automation objects or project elements. Project analysis component 214 can be configured to analyze a system project as a whole to identify dependencies between project elements for the purposes of generating and executing appropriate test scripts on related portions of the system project.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
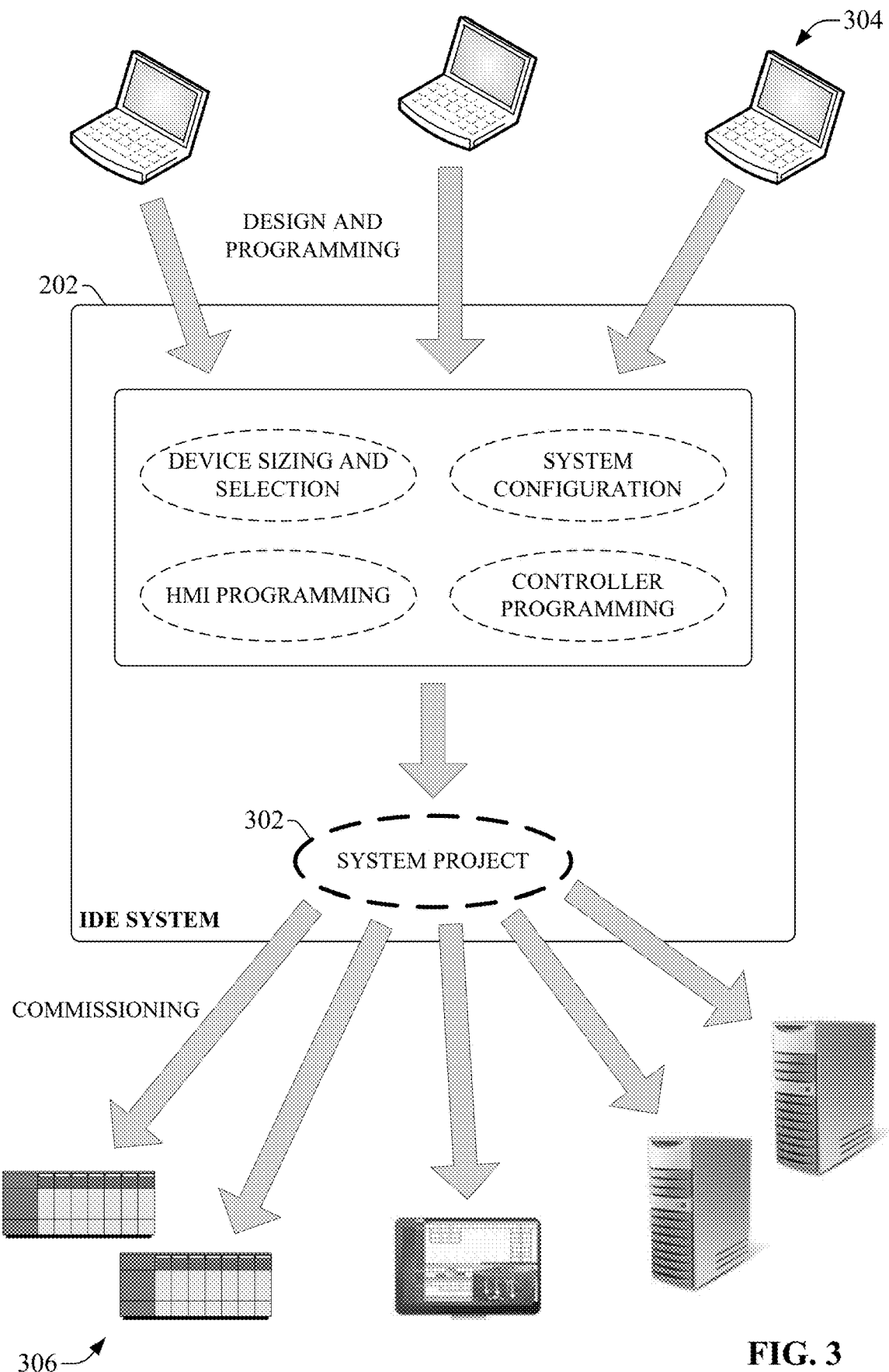
FIG. 3 is a diagram illustrating a generalized architecture of an industrial IDE system.

FIG. 3 is a diagram illustrating a generalized architecture of the industrial IDE system 202 according to one or more embodiments. Industrial IDE system 202 can implement a common set of services and workflows spanning not only design, but also commissioning, operation, and maintenance. In terms of design, the IDE system 202 can support not only industrial controller programming and HMI development, but also sizing and selection of system components, device/system configuration, AR/VR visualizations, and other features. The IDE system 202 can also include tools that simplify and automate commissioning of the resulting project and assist with subsequent administration of the deployed system during runtime.

Embodiments of the IDE system 202 that are implemented on a cloud platform also facilitate collaborative project development whereby multiple developers 304 contribute design and programming input to a common automation system project 302. Collaborative tools supported by the IDE system can manage design contributions from the multiple contributors and perform version control of the aggregate system project 302 to ensure project consistency.

Based on design and programming input from one or more developers 304, IDE system 202 generates a system project 302 comprising one or more project files. The system project 302 encodes one or more of control programming; HMI, AR, and/or VR visualizations; device or sub-system configuration data (e.g., drive parameters, vision system configurations, telemetry device parameters, safety zone definitions, etc.); or other such aspects of an industrial automation system being designed. IDE system 202 can identify the appropriate target devices 306 on which respective aspects of the system project 302 should be executed (e.g., industrial controllers, HMI terminals, variable frequency drives, safety devices, etc.), translate the system project 302 to executable files that can be executed on the respective target devices, and deploy the executable files to their corresponding target devices 306 for execution, thereby commissioning the system project 302 to the plant floor for implementation of the automation project.

Figure 4:
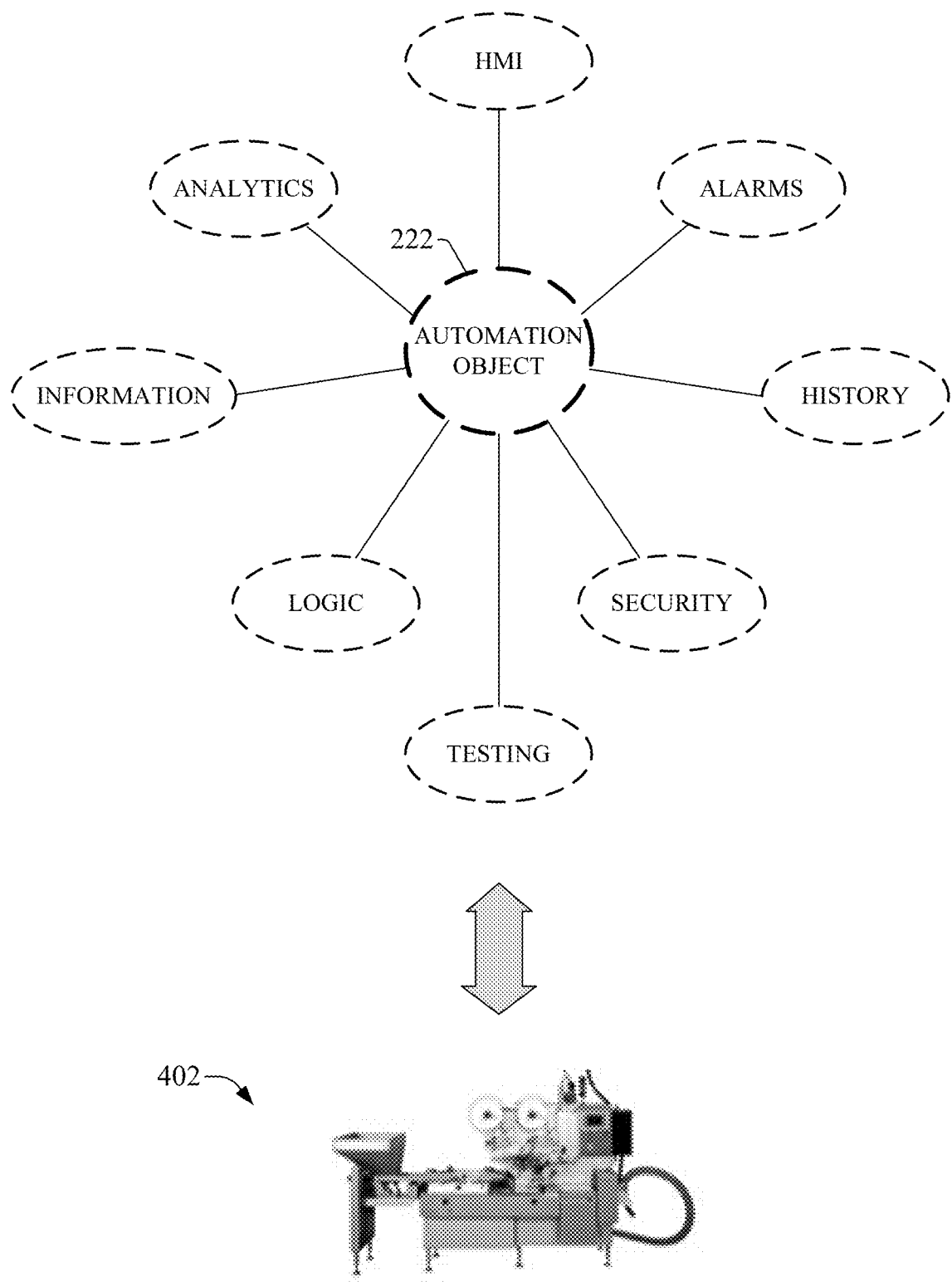
FIG. 4 is a diagram illustrating several example automation object properties that can be leveraged by the IDE system in connection with building, deploying, and executing a system project.

To support enhanced development capabilities, some embodiments of IDE system 202 can be built on an object-based data model rather than a tag-based architecture. Automation objects 222 serve as the building block for this object-based development architecture. FIG. 4 is a diagram illustrating several example automation object properties that can be leveraged by the IDE system 202 in connection with building, deploying, and executing a system project 302. Automation objects 222 can be created and augmented during design, integrated into larger data models, and consumed during runtime. These automation objects 222 provide a common data structure across the IDE system 202 and can be stored in an object library (e.g., part of memory 220) for reuse. The object library can store predefined automation objects 222 representing various classifications of real-world industrial assets 402, including but not limited to pumps, tanks, values, motors, motor drives (e.g., variable frequency drives), industrial robots, actuators (e.g., pneumatic or hydraulic actuators), or other such assets. Automation objects 222 can represent elements at substantially any level of an industrial enterprise, including individual devices, machines made up of many industrial devices and components (some of which may be associated with their own automation objects 222), and entire production lines or process control systems.

An automation object 222 for a given type of industrial asset can encode such aspects as 2D or 3D visualizations, alarms, control coding (e.g., logic or other type of control programming), analytics, startup procedures, testing protocols and scripts, validation reports, simulations, schematics, security protocols, and other such properties associated with the industrial asset 402 represented by the object 222. Automation objects 222 can also be geotagged with location information identifying the location of the associated asset. During runtime of the system project 302, the automation object 222 corresponding to a given real-world asset 402 can also record status or operational history data for the asset. In general, automation objects 222 serve as programmatic representations of their corresponding industrial assets 402, and can be incorporated into a system project 302 as elements of control code, a 2D or 3D visualization, a knowledgebase or maintenance guidance system for the industrial assets, or other such aspects.

Figure 5:
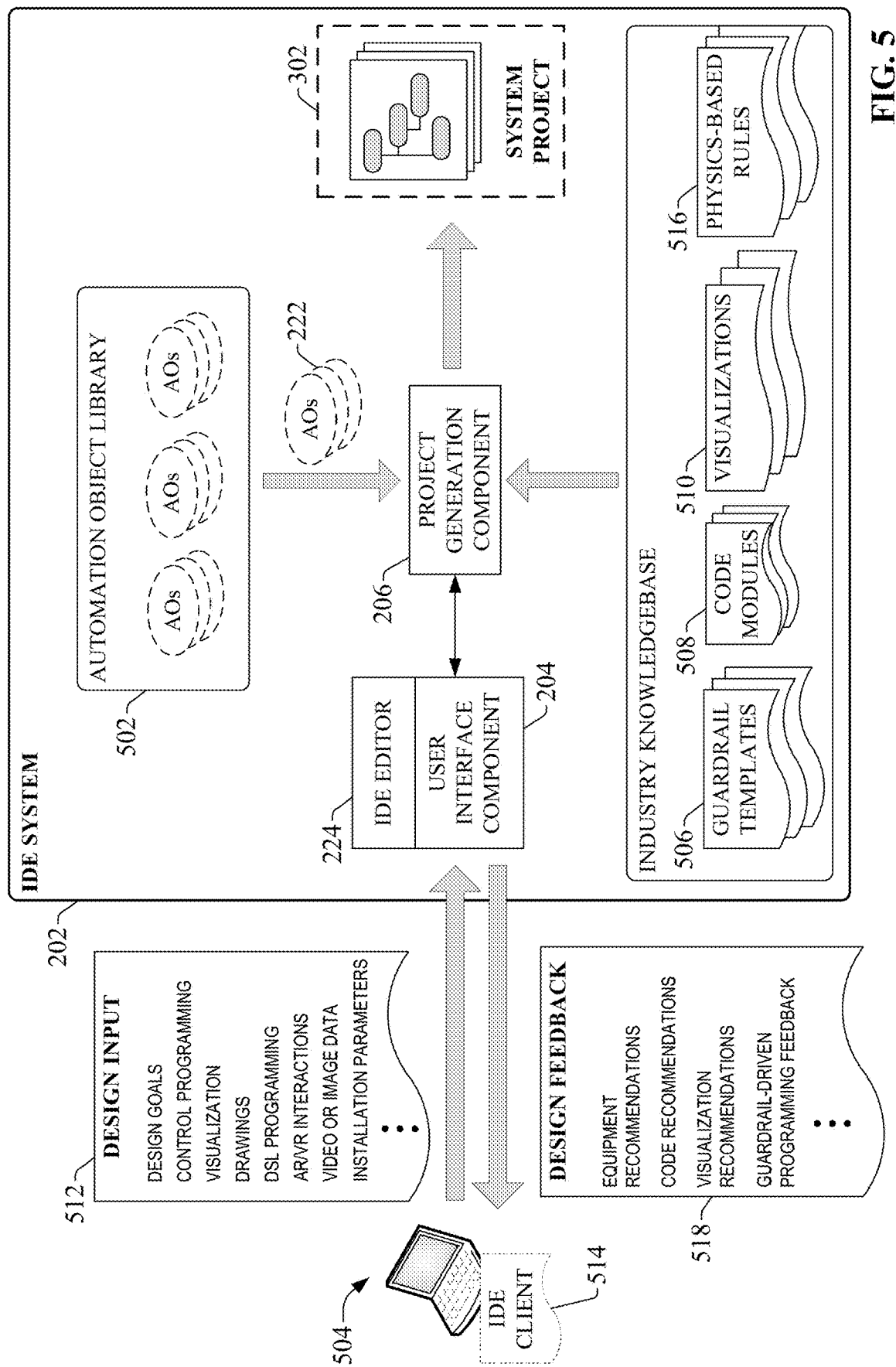
FIG. 5 is a diagram illustrating example data flows associated with creation of a system project for an automation system being designed using an industrial IDE system.

FIG. 5 is a diagram illustrating example data flows associated with creation of a system project 302 for an automation system being designed using IDE system 202 according to one or more embodiments. A client device 504 (e.g., a laptop computer, tablet computer, desktop computer, mobile device, wearable AR/VR appliance, etc.) executing an IDE client application 514 can access the IDE system's project development tools and leverage these tools to create a comprehensive system project 302 for an automation system being developed. Through interaction with the system's user interface component 204, developers can submit design input 512 to the IDE system 202 in various supported formats, including industry-specific control programming (e.g., control logic, structured text, sequential function charts, etc.) and HMI screen configuration input. Based on this design input 512 and information stored in an industry knowledgebase (predefined code modules 508 and visualizations 510, guardrail templates 506, physics-based rules 516, etc.), user interface component 204 renders design feedback 518 designed to assist the developer in connection with developing a system project 302 for configuration, control, and visualization of an industrial automation system.

In addition to control programming and visualization definitions, some embodiments of IDE system 202 can be configured to receive digital engineering drawings (e.g., computer-aided design (CAD) files) as design input 512. In such embodiments, project generation component 206 can generate portions of the system project 302—e.g., by automatically generating control and/or visualization code—based on analysis of existing design drawings. Drawings that can be submitted as design input 512 can include, but are not limited to, P&ID drawings, mechanical drawings, flow diagrams, or other such documents. For example, a P&ID drawing can be imported into the IDE system 202, and project generation component 206 can identify elements (e.g., tanks, pumps, etc.) and relationships therebetween conveyed by the drawings. Project generation component 206 can associate or map elements identified in the drawings with appropriate automation objects 222 corresponding to these elements (e.g., tanks, pumps, etc.) and add these automation objects 222 to the system project 302. The device-specific and asset-specific automation objects 222 include suitable code and visualizations to be associated with the elements identified in the drawings. In general, the IDE system 202 can examine one or more different types of drawings (mechanical, electrical, piping, etc.) to determine relationships between devices, machines, and/or assets (including identifying common elements across different drawings) and intelligently associate these elements with appropriate automation objects 222, code modules 508, and/or visualizations 510. The IDE system 202 can leverage physics-based rules 516 as well as pre-defined code modules 508 and visualizations 510 as necessary in connection with generating code or project data for system project 302.

The IDE system 202 can also determine whether pre-defined visualization content is available for any of the objects discovered in the drawings and generate appropriate HMI screens or AR/VR content for the discovered objects based on these pre-defined visualizations. To this end, the IDE system 202 can store industry-specific, asset-specific, and/or application-specific visualizations 510 that can be accessed by the project generation component 206 as needed. These visualizations 510 can be classified according to industry or industrial vertical (e.g., automotive, food and drug, oil and gas, pharmaceutical, etc.), type of industrial asset (e.g., a type of machine or industrial device), a type of industrial application (e.g., batch processing, flow control, web tension control, sheet metal stamping, water treatment, etc.), or other such categories. Predefined visualizations 510 can comprise visualizations in a variety of formats, including but not limited to HMI screens or windows, mashups that aggregate data from multiple pre-specified sources, AR overlays, VR objects representing 3D virtualizations of the associated industrial asset, or other such visualization formats. IDE system 202 can select a suitable visualization for a given object based on a predefined association between the object type and the visualization content.

In another example, markings applied to an engineering drawing by a user can be understood by some embodiments of the project generation component 206 to convey a specific design intention or parameter. For example, a marking in red pen can be understood to indicate a safety zone, two circles connected by a dashed line can be interpreted as a gearing relationship, and a bold line may indicate a camming relationship. In this way, a designer can sketch out design goals on an existing drawing in a manner that can be understood and leveraged by the IDE system 202 to generate code and visualizations. In another example, the project generation component 206 can learn permissives and interlocks (e.g., valves and their associated states) that serve as necessary preconditions for starting a machine based on analysis of the user's CAD drawings. Project generation component 206 can generate any suitable code (ladder logic, function blocks, etc.), device configurations, and visualizations based on analysis of these drawings and markings for incorporation into system project 302. In some embodiments, user interface component 204 can include design tools for developing engineering drawings within the IDE platform itself, and the project generation component 206 can generate this code as a background process as the user is creating the drawings for a new project. In some embodiments, project generation component 206 can also translate state machine drawings to a corresponding programming sequence, yielding at least skeletal code that can be enhanced by the developer with additional programming details as needed.

Also, or in addition, some embodiments of IDE system 202 can support goal-based automated programming. For example, the user interface component 204 can allow the user to specify production goals for an automation system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 206 will generate portions of the system project 302 to satisfy the specified design goals and constraints. Portions of the system project 302 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control coding, or HMI screens suitable for visualizing the automation system being designed.

Some embodiments of the project generation component 206 can also generate at least some of the project code for system project 302 based on knowledge of parts that have been ordered for the project being developed. This can involve accessing the customer's account information maintained by an equipment vendor to identify devices that have been purchased for the project. Based on this information the project generation component 206 can add appropriate automation objects 222 and associated code modules 508 corresponding to the purchased assets, thereby providing a starting point for project development.

Some embodiments of project generation component 206 can also monitor customer-specific design approaches for commonly programmed functions (e.g., pumping applications, batch processes, palletizing operations, etc.) and generate recommendations for design modules (e.g., code modules 508, visualizations 510, etc.) that the user may wish to incorporate into a current design project based on an inference of the designer's goals and learned approaches to achieving the goal. To this end, some embodiments of project generation component 206 can be configured to monitor design input 512 over time and, based on this monitoring, learn correlations between certain design actions (e.g., addition of certain code modules or snippets to design projects, selection of certain visualizations, etc.) and types of industrial assets, industrial sequences, or industrial processes being designed. Project generation component 206 can record these learned correlations and generate recommendations during subsequent project development sessions based on these correlations. For example, if project generation component 206 determines, based on analysis of design input 512, that a designer is currently developing a control project involving a type of industrial equipment that has been programmed and/or visualized in the past in a repeated, predictable manner, the project generation component 206 can instruct user interface component 204 to render recommended development steps or code modules 508 the designer may wish to incorporate into the system project 302 based on how this equipment was configured and/or programmed in the past.

In some embodiments, IDE system 202 can also store and implement guardrail templates 506 that define design guardrails intended to ensure the project's compliance with internal or external design standards. Based on design parameters defined by one or more selected guardrail templates 506, user interface component 204 can provide, as a subset of design feedback 518, dynamic recommendations or other types of feedback designed to guide the developer in a manner that ensures compliance of the system project 302 with internal or external requirements or standards (e.g., certifications such as TUV certification, in-house design standards, industry-specific or vertical-specific design standards, etc.). This feedback 518 can take the form of text-based recommendations (e.g., recommendations to rewrite an indicated portion of control code to comply with a defined programming standard), syntax highlighting, error highlighting, auto-completion of code snippets, or other such formats. In this way, IDE system 202 can customize design feedback 518—including programming recommendations, recommendations of predefined code modules 508 or visualizations 510, error and syntax highlighting, etc.—in accordance with the type of industrial system being developed and any applicable in-house design standards.

Guardrail templates 506 can also be designed to maintain compliance with global best practices applicable to control programming or other aspects of project development. For example, user interface component 204 may generate and render an alert if a developer's control programing is deemed to be too complex as defined by criteria specified by one or more guardrail templates 506. Since different verticals (e.g., automotive, pharmaceutical, oil and gas, food and drug, marine, etc.) must adhere to different standards and certifications, the IDE system 202 can maintain a library of guardrail templates 506 for different internal and external standards and certifications, including customized user-specific guardrail templates 506. These guardrail templates 506 can be classified according to industrial vertical, type of industrial application, plant facility (in the case of custom in-house guardrail templates 506) or other such categories. During development, project generation component 206 can select and apply a subset of guardrail templates 506 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 206 can leverage guardrail templates 506 to implement rules-based programming, whereby programming feedback (a subset of design feedback 518) such as dynamic intelligent autocorrection, type-aheads, or coding suggestions are rendered based on encoded industry expertise and best practices (e.g., identifying inefficiencies in code being developed and recommending appropriate corrections).

Users can also run their own internal guardrail templates 506 against code provided by outside vendors (e.g., OEMs) to ensure that this code complies with in-house programming standards. In such scenarios, vendor-provided code can be submitted to the IDE system 202, and project generation component 206 can analyze this code in view of in-house coding standards specified by one or more custom guardrail templates 506. Based on results of this analysis, user interface component 204 can indicate portions of the vendor-provided code (e.g., using highlights, overlaid text, etc.) that do not conform to the programming standards set forth by the guardrail templates 506, and display suggestions for modifying the code in order to bring the code into compliance. As an alternative or in addition to recommending these modifications, some embodiments of project generation component 206 can be configured to automatically modify the code in accordance with the recommendations to bring the code into conformance.

In making coding suggestions as part of design feedback 518, project generation component 206 can invoke selected code modules 508 stored in a code module database (e.g., on memory 220). These code modules 508 comprise standardized coding segments for controlling common industrial tasks or applications (e.g., palletizing, flow control, web tension control, pick-and-place applications, conveyor control, etc.). In some embodiments, code modules 508 can be categorized according to one or more of an industrial vertical (e.g., automotive, food and drug, oil and gas, textiles, marine, pharmaceutical, etc.), an industrial application, or a type of machine or device to which the code module 508 is applicable. In some embodiments, project generation component 206 can infer a programmer's current programming task or design goal based on programmatic input being provided by a the programmer (as a subset of design input 512), and determine, based on this task or goal, whether one of the pre-defined code modules 508 may be appropriately added to the control program being developed to achieve the inferred task or goal. For example, project generation component 206 may infer, based on analysis of design input 512, that the programmer is currently developing control code for transferring material from a first tank to another tank, and in response, recommend inclusion of a predefined code module 508 comprising standardized or frequently utilized code for controlling the valves, pumps, or other assets necessary to achieve the material transfer.

Customized guardrail templates 506 can also be defined to capture nuances of a customer site that should be taken into consideration in the project design. For example, a guardrail template 506 could record the fact that the automation system being designed will be installed in a region where power outages are common, and will factor this consideration when generating design feedback 518; e.g., by recommending implementation of backup uninterruptable power supplies and suggesting how these should be incorporated, as well as recommending associated programming or control strategies that take these outages into account.

IDE system 202 can also use guardrail templates 506 to guide user selection of equipment or devices for a given design goal; e.g., based on the industrial vertical, type of control application (e.g., sheet metal stamping, die casting, palletization, conveyor control, web tension control, batch processing, etc.), budgetary constraints for the project, physical constraints at the installation site (e.g., available floor, wall or cabinet space; dimensions of the installation space; etc.), equipment already existing at the site, etc. Some or all of these parameters and constraints can be provided as design input 512, and user interface component 204 can render the equipment recommendations as a subset of design feedback 518. In some embodiments, project generation component 206 can also determine whether some or all existing equipment can be repurposed for the new control system being designed. For example, if a new bottling line is to be added to a production area, there may be an opportunity to leverage existing equipment since some bottling lines already exist. The decision as to which devices and equipment can be reused will affect the design of the new control system. Accordingly, some of the design input 512 provided to the IDE system 202 can include specifics of the customer's existing systems within or near the installation site. In some embodiments, project generation component 206 can apply artificial intelligence (AI) or traditional analytic approaches to this information to determine whether existing equipment specified in design in put 512 can be repurposed or leveraged. Based on results of this analysis, project generation component 206 can generate, as design feedback 518, a list of any new equipment that may need to be purchased based on these decisions.

In some embodiments, IDE system 202 can offer design recommendations based on an understanding of the physical environment within which the automation system being designed will be installed. To this end, information regarding the physical environment can be submitted to the IDE system 202 (as part of design input 512) in the form of 2D or 3D images or video of the plant environment. This environmental information can also be obtained from an existing digital twin of the plant, or by analysis of scanned environmental data obtained by a wearable AR appliance in some embodiments. Project generation component 206 can analyze this image, video, or digital twin data to identify physical elements within the installation area (e.g., walls, girders, safety fences, existing machines and devices, etc.) and physical relationships between these elements. This can include ascertaining distances between machines, lengths of piping runs, locations and distances of wiring harnesses or cable trays, etc. Based on results of this analysis, project generation component 206 can add context to schematics generated as part of system project 302, generate recommendations regarding optimal locations for devices or machines (e.g., recommending a minimum separation between power and data cables), or make other refinements to the system project 302. At least some of this design data can be generated based on physics-based rules 516, which can be referenced by project generation component 206 to determine such physical design specifications as minimum safe distances from hazardous equipment (which may also factor into determining suitable locations for installation of safety devices relative to this equipment, given expected human or vehicle reaction times defined by the physics-based rules 516), material selections capable of withstanding expected loads, piping configurations and tuning for a specified flow control application, wiring gauges suitable for an expected electrical load, minimum distances between signal wiring and electromagnetic field (EMF) sources to ensure negligible electrical interference on data signals, or other such design features that are dependent on physical rules.

In an example use case, relative locations of machines and devices specified by physical environment information submitted to the IDE system 202 can be used by the project generation component 206 to generate design data for an industrial safety system. For example, project generation component 206 can analyze distance measurements between safety equipment and hazardous machines and, based on these measurements, determine suitable placements and configurations of safety devices and associated safety controllers that ensure the machine will shut down within a sufficient safety reaction time to prevent injury (e.g., in the event that a person runs through a light curtain).

In some embodiments, project generation component 206 can also analyze photographic or video data of an existing machine to determine inline mechanical properties such as gearing or camming and factor this information into one or more guardrail templates 506 or design recommendations.

Figure 6:
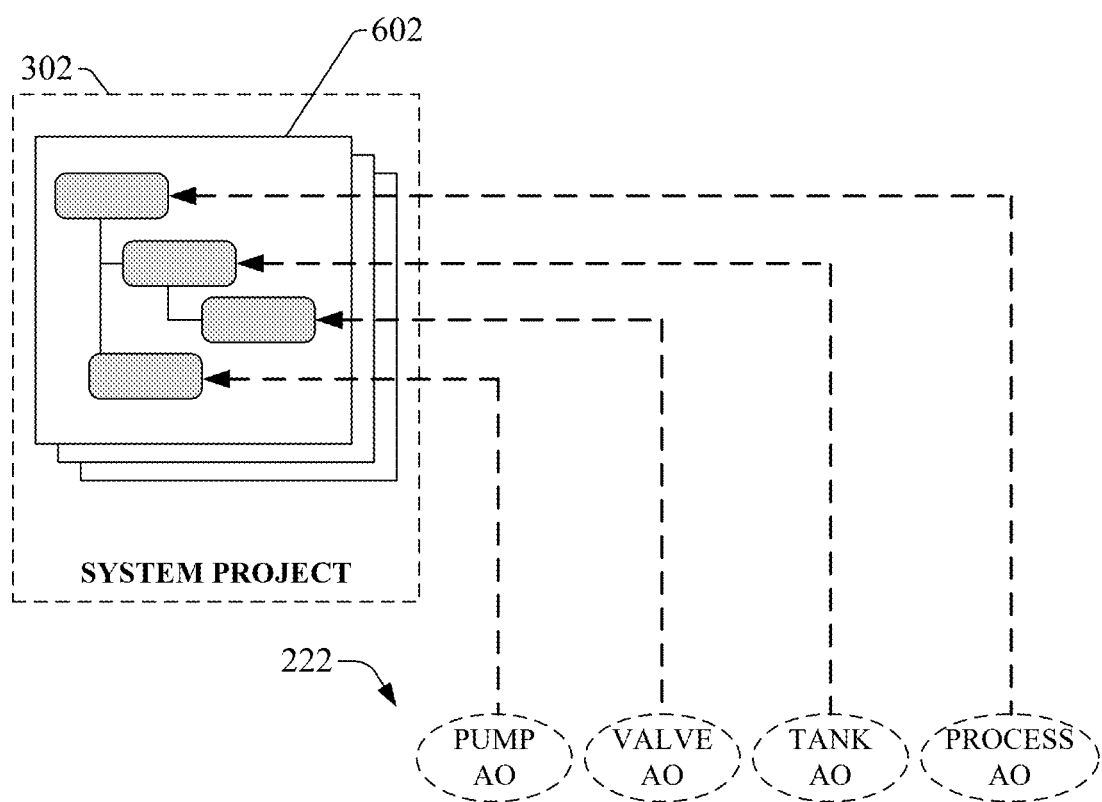
FIG. 6 is a diagram illustrating an example system project that incorporates automation objects into a project model.

As noted above, the system project 302 generated by IDE system 202 for a given automaton system being designed can be built upon an object-based architecture that uses automation objects 222 as building blocks. FIG. 6 is a diagram illustrating an example system project 302 that incorporates automation objects 222 into the project model. In this example, various automation objects 222 representing analogous industrial devices, systems, or assets of an automation system (e.g., a process, tanks, valves, pumps, etc.) have been incorporated into system project 302 as elements of a larger project data model 602. The project data model 602 also defines hierarchical relationships between these automation objects 222. According to an example relationship, a process automation object representing a batch process may be defined as a parent object to a number of child objects representing devices and equipment that carry out the process, such as tanks, pumps, and valves. Each automation object 222 has associated therewith object properties or attributes specific to its corresponding industrial asset (e.g., those discussed above in connection with FIG. 4), including executable control programming for controlling the asset (or for coordinating the actions of the asset with other industrial assets) and visualizations that can be used to render relevant information about the asset during runtime.

At least some of the attributes of each automation object 222—including testing scripts associated with the automation objects 222, to be discussed in more detail herein—are default properties defined by the IDE system 202 based on encoded industry expertise pertaining to the asset represented by the objects. Other properties can be modified or added by the developer as needed (via design input 512) to customize the object 222 for the particular asset and/or industrial application for which the system projects 302 is being developed. This can include, for example, associating customized control code, HMI screens, AR presentations, or help files associated with selected automation objects 222. In this way, automation objects 222 can be created and augmented as needed during design for consumption or execution by target control devices during runtime.

Figure 7:
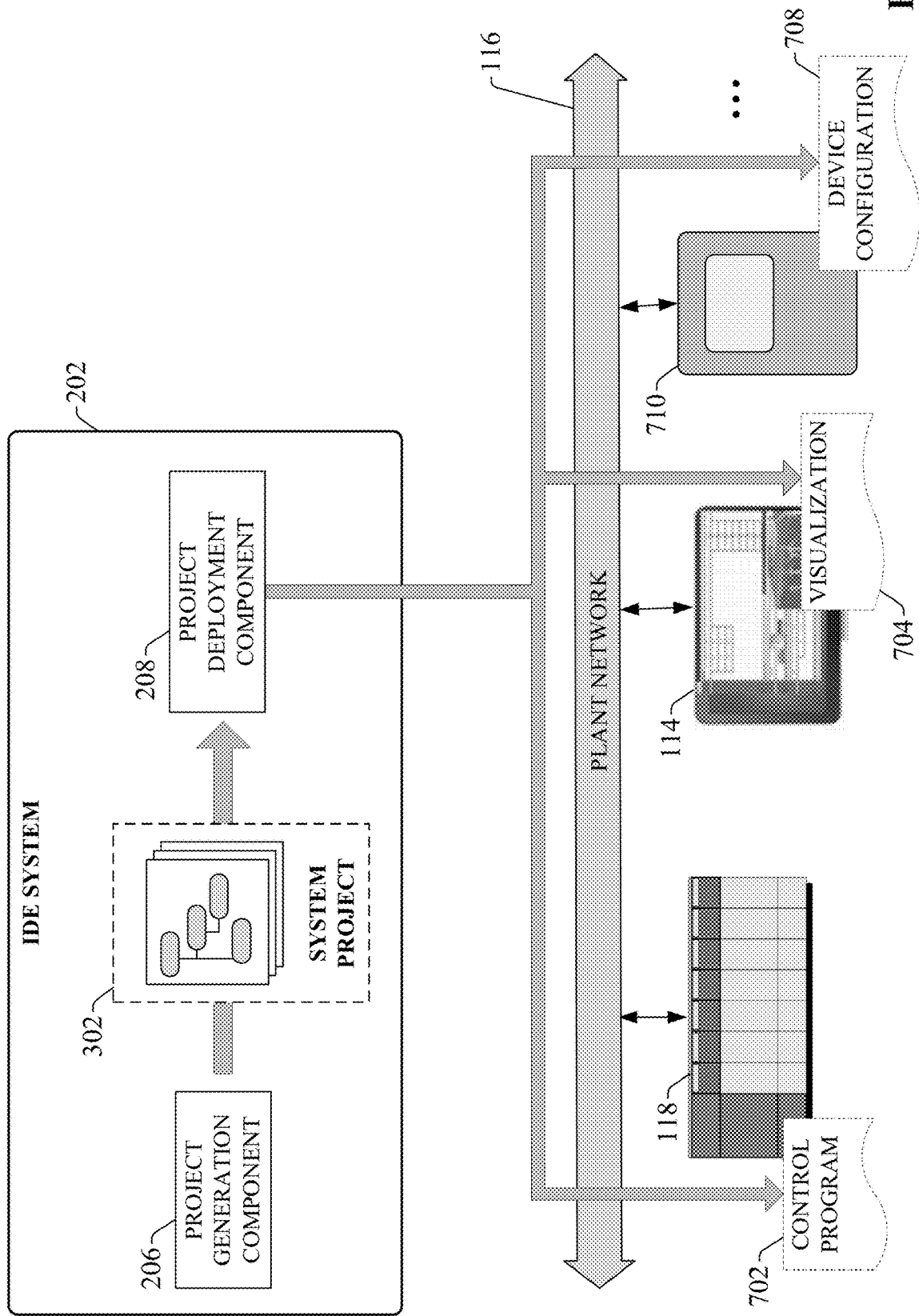
FIG. 7 is a diagram illustrating commissioning of a system project.

Once development and testing on a system project 302 has been completed, commissioning tools supported by the IDE system 202 can simplify the process of commissioning the project in the field. When the system project 302 for a given automation system has been completed, the system project 302 can be deployed to one or more target control devices for execution. FIG. 7 is a diagram illustrating commissioning of a system project 302. Project deployment component 208 can compile or otherwise translate a completed system project 302 into one or more executable files or configuration files that can be stored and executed on respective target industrial devices of the automation system (e.g., industrial controllers 118, HMI terminals 114 or other types of visualization systems, motor drives 710, telemetry devices, vision systems, safety relays, etc.).

Conventional control program development platforms require the developer to specify the type of industrial controller (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDE system 202 can abstract project development from the specific controller type, allowing the designer to develop the system project 302 as a logical representation of the automation system in a manner that is agnostic to where and how the various control aspects of system project 302 will run. Once project development is complete and system project 302 is ready for commissioning, the user can specify (via user interface component 204) target devices on which respective aspects of the system project 302 are to be executed. In response, an allocation engine of the project deployment component 208 will translate aspects of the system project 302 to respective executable files formatted for storage and execution on their respective target devices.

For example, system project 302 may include—among other project aspects—control code, visualization screen definitions, and motor drive parameter definitions. Upon completion of project development, a user can identify which target device—including an industrial controller 118, an HMI terminal 114, and a motor drive 710—are to execute or receive these respective aspects of the system project 302. Project deployment component 208 can then translate the controller code defined by the system project 302 to a control program file 702 formatted for execution on the specified industrial controller 118 and send this control program file 702 to the controller 118 (e.g., via plant network 116). Similarly, project deployment component 208 can translate the visualization definitions and motor drive parameter definitions to a visualization application 704 and a device configuration file 708, respectively, and deploy these files to their respective target devices for execution and/or device configuration.

In general, project deployment component 208 performs any conversions necessary to allow aspects of system project 302 to execute on the specified devices. Any inherent relationships, handshakes, or data sharing defined in the system project 302 are maintained regardless of how the various elements of the system project 302 are distributed. In this way, embodiments of the IDE system 202 can decouple the project from how and where the project is to be run. This also allows the same system project 302 to be commissioned at different plant facilities having different sets of control equipment. That is, some embodiments of the IDE system 202 can allocate project code to different target devices as a function of the particular devices found on-site. IDE system 202 can also allow some portions of the project file to be commissioned as an emulator or on a cloud-based controller.

As an alternative to having the user specify the target control devices to which the system project 302 is to be deployed, some embodiments of IDE system 202 can actively connect to the plant network 116 and discover available devices, ascertain the control hardware architecture present on the plant floor, infer appropriate target devices for respective executable aspects of system project 302, and deploy the system project 302 to these selected target devices. As part of this commissioning process, IDE system 202 can also connect to remote knowledgebases (e.g., web-based or cloud-based knowledgebases) to determine which discovered devices are out of date or require firmware upgrade to properly execute the system project 302. In this way, the IDE system 202 can serve as a link between device vendors and a customer's plant ecosystem via a trusted connection in the cloud.

Copies of system project 302 can be propagated to multiple plant facilities having varying equipment configurations using smart propagation, whereby the project deployment component 208 intelligently associates project components with the correct industrial asset or control device even if the equipment on-site does not perfectly match the defined target (e.g., if different pump types are found at different sites). For target devices that do not perfectly match the expected asset, project deployment component 208 can calculate the estimated impact of running the system project 302 on non-optimal target equipment and generate warnings or recommendations for mitigating expected deviations from optimal project execution.

Figure 8:
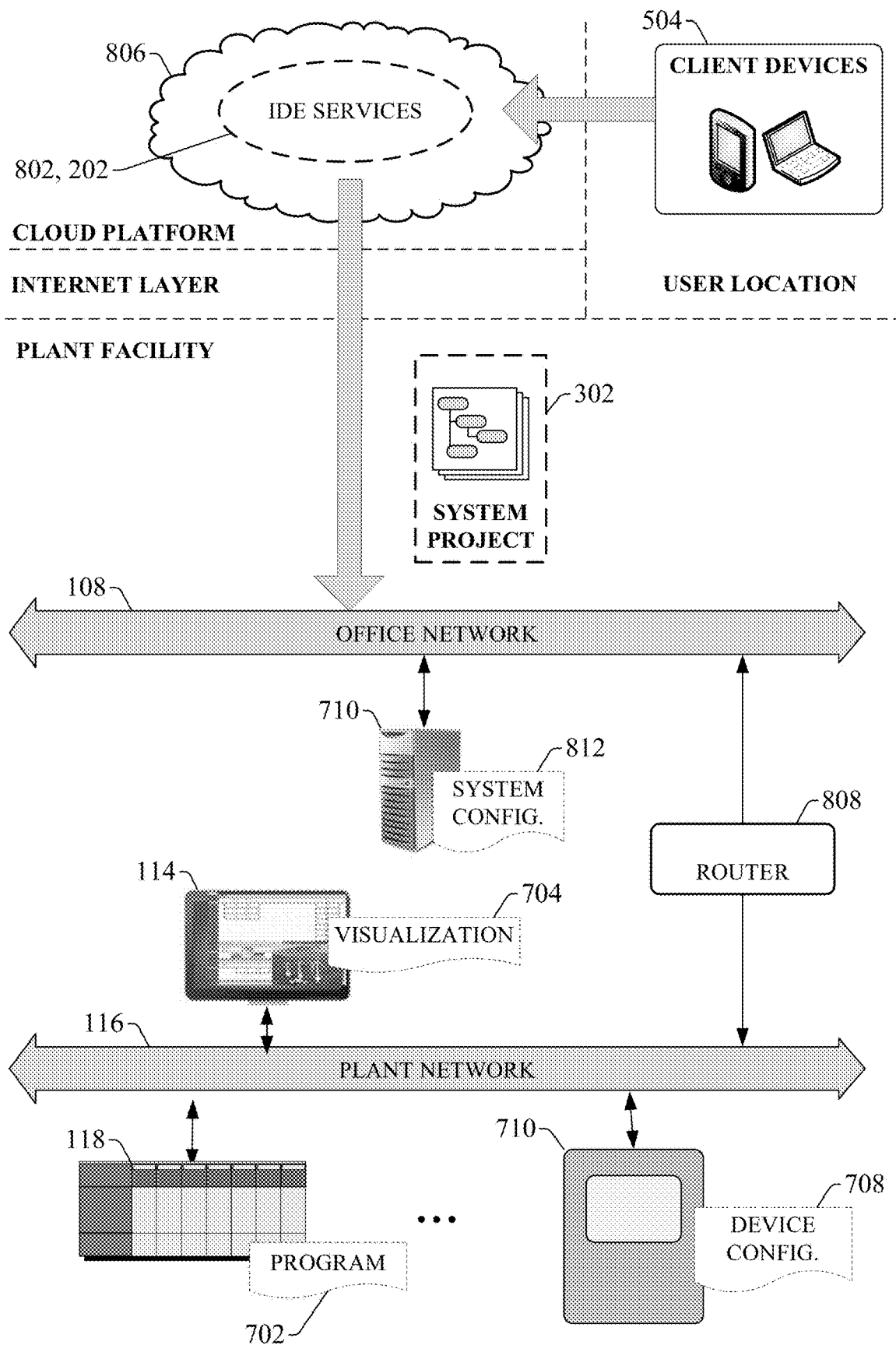
FIG. 8 is a diagram illustrating an example architecture in which cloud-based IDE services are used to develop and deploy industrial applications to a plant environment.

As noted above, some embodiments of IDE system 202 can be embodied on a cloud platform. FIG. 8 is a diagram illustrating an example architecture in which cloud-based IDE services 802 are used to develop and deploy industrial applications to a plant environment. In this example, the industrial environment includes one or more industrial controllers 118, HMI terminals 114, motor drives 710, servers 801 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 810 reside on a separate office network 108 that is connected to the plant network 116 (e.g., through a router 808 or other network infrastructure device).

In this example, IDE system 202 resides on a cloud platform 806 and executes as a set of cloud-based IDE service 802 that are accessible to authorized remote client devices 504. Cloud platform 806 can be any infrastructure that allows shared computing services (such as IDE services 802) to be accessed and utilized by cloud-capable devices. Cloud platform 806 can be a public cloud accessible via the Internet by devices 504 having Internet connectivity and appropriate authorizations to utilize the IDE services 802. In some scenarios, cloud platform 806 can be provided by a cloud provider as a platform-as-a-service (PaaS), and the IDE services 802 can reside and execute on the cloud platform 806 as a cloud-based service. In some such configurations, access to the cloud platform 806 and associated IDE services 802 can be provided to customers as a subscription service by an owner of the IDE services 802. Alternatively, cloud platform 806 can be a private cloud operated internally by the industrial enterprise (the owner of the plant facility). An example private cloud platform can comprise a set of servers hosting the IDE services 802 and residing on a corporate network protected by a firewall.

Cloud-based implementations of IDE system 202 can facilitate collaborative development by multiple remote developers who are authorized to access the IDE services 802. When a system project 302 is ready for deployment, the project 302 can be commissioned to the plant facility via a secure connection between the office network 108 or the plant network 116 and the cloud platform 806. As discussed above, the industrial IDE services 802 can translate system project 302 to one or more appropriate executable files—control program files 702, visualization applications 704, device configuration files 708, system configuration files 812—and deploy these files to the appropriate devices in the plant facility to facilitate implementation of the automation project.

Figure 9:
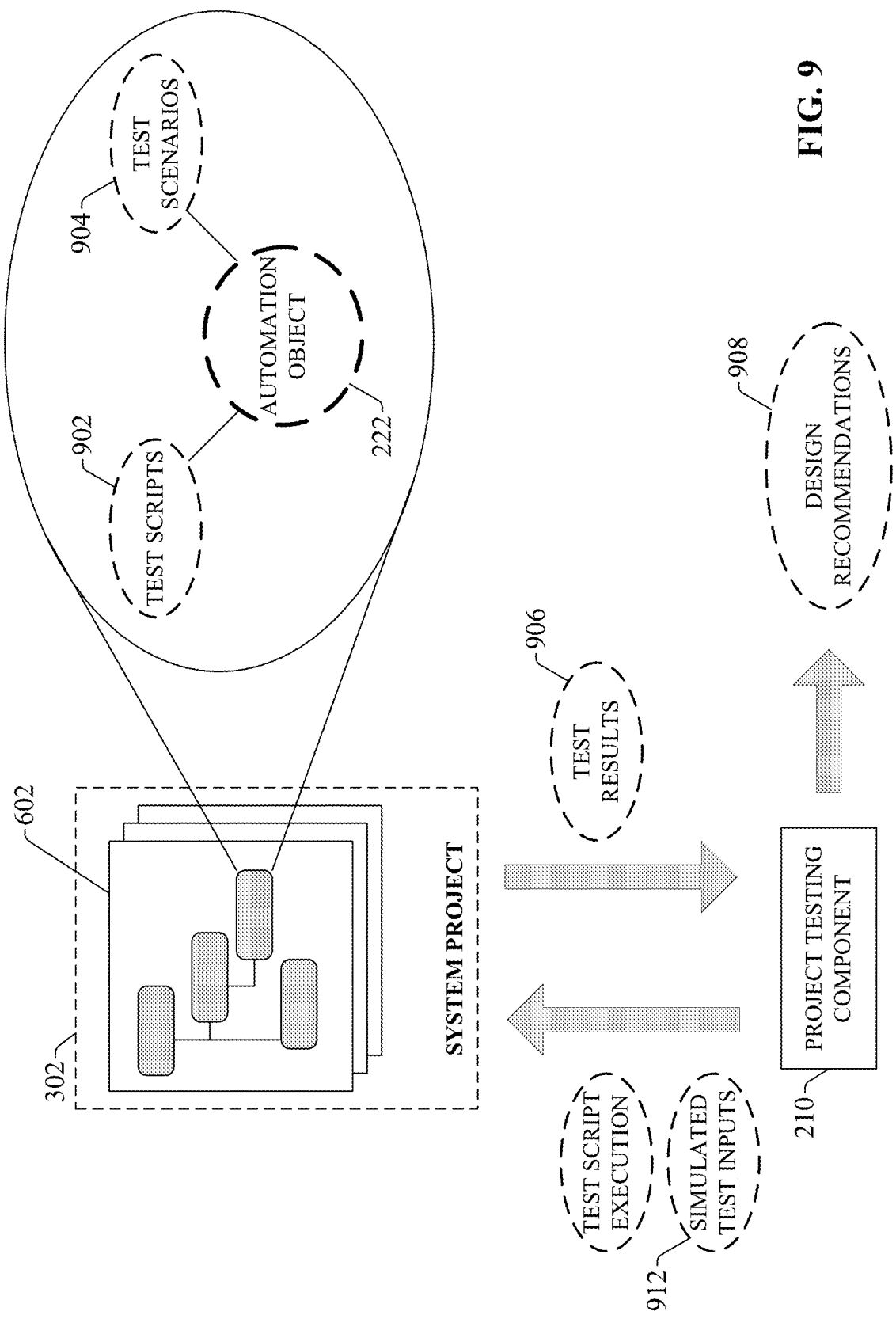
FIG. 9 is a diagram illustrating testing of an example system project by an IDE system's project testing component.

To mitigate the need to write test scripts to test and debug system project 302, IDE system 202 can support a testing framework that verifies operation of the project 302 at all levels. As part of this testing framework, automation objects 222 can include, among their various properties and attributes discussed above in connection with FIG. 4, associated testing elements that can be used to validate the system project 302 across a range of relevant scenarios. FIG. 9 is a diagram illustrating testing of an example system project 302 by the IDE system's project testing component 210. As noted above, the project data model 602 that serves as a basis for system project 302 defines hierarchical relationships between automation objects 222, which can represent aspects of an automation system such as industrial assets (e.g., controllers, tanks, valves, vats, industrial robots, pumps, etc.), industrial processes, industrial devices, or other system aspects. In addition to other properties and attributes associated with the automation objects 222 as discussed above in connection with FIG. 4 (e.g., logic elements, visualization elements, etc.), automation objects 222 can also include test properties as part of a global testing framework supported by the IDE system 202. These test properties can include object-specific test scripts 902 designed to test and debug the automation object 222 and associated aspects of system project 302 that reference the object 222. The object's test properties can also include object-specific test scenario definitions 904 that define one or more test scenarios that may beneficially be run against the automation object 222 and associated project elements that reference the object 222. The test scenario definitions 904 can be designed based on industrial expertise regarding the industrial asset or process represented by the automation object 222.

Automation objects 222 can be provided with pre-bundled test scripts 902 and/or test scenario definitions 904 that are specific to the type of industrial asset represented by the automation object 222. During or after development of system project 302 as described above, the IDE system's project testing component 210 can execute test scripts 902 associated with one or more selected automation objects 222 as appropriate to verify proper responses of the system project 302, thereby validating the project. To this end, test scripts 902 can define simulated test inputs 912 to be provided to the automation object 222 and/or associated project code in which the object 222 is used, as well as expected responses of the automation object 222 and its associated project code to the simulated inputs 912.

According to an example testing procedure, project testing component 210 can execute one or more test scripts 902 associated with respective one or more automation objects 222 against system project 302. Execution of the test scripts 902 can involve, for example, feeding simulated test inputs 912 to control code or other elements of system project 302 according to a sequence defined by the test scripts 902, setting values of digital or analog program variables defined by the system project 302 according to a defined sequence, initiating control routines of the system project 302 according to a defined sequence, testing animation objects or other visualization elements defined by the system project 302, verifying data linkages between control routines, verifying relationships between program elements and drawing elements, confirming that device configuration settings or parameter values are appropriate for a given industrial application being carried out by the system project 302, or otherwise interacting with system project 302 according to testing procedures defined by the test scripts 902. During testing, the project testing component 210 can monitor test results 906 or responses of the system project 302 to the test interactions defined by the test scripts 902 and determine whether these test results 906 match expected results defined by the test scripts 902. In this way, proper operation of the system project 302 can be verified prior to deployment without the need to develop custom test scripts to debug the system project code.

In some test scenarios, test scripts 902 can define testing sequences that are applied to the system project 302 as a whole in a holistic manner rather than to a specific control program or routine. For example, the project testing component 210 can execute test scripts 902 that verify linkages or relationships across design platforms—e.g., control code, visualization applications, electrical drawings, panel layout definitions, wiring schedules, piping diagrams, etc.—that may otherwise not be tested.

If the test results 906 indicate an improper operation of one or more aspects of system project 302, project testing component 210 may generate and render one or more design recommendations 908 indicating possible modifications to the system project 302 that would correct operation of the project. These design recommendations 908 may include, for example, control code modifications or replacements, recommended corrections of data tag addresses, recommended corrections to HMI graphical object references, recommended corrections to mechanical or electrical drawings for consistency with the control code (e.g., to add a missing output device to an electrical drawing corresponding to an output device referenced by the control programming), recommended modifications to an industrial device's configuration parameters, or other such corrections.

The testing properties of some automation objects 222 may define multiple test scenarios 904 that should be run on the object 222 and its corresponding control code and project elements to ensure comprehensive testing of the object 222 and related code. These scenarios 904 are based on pre-learned industrial expertise relating to the industrial asset or process represented by the automation objects and its related project elements. In some implementations, each defined test scenario 904 may have its own associated test script 902, or may define a particular way to apply the test script 902 (e.g., which routines of the system project's control code to validate, which other project elements should be cross-referenced for validation purposes, etc.). During testing of the system project 302, project testing component 210 can execute the one or more test scripts 902 in accordance with each defined test scenario 904 in sequence in order to comprehensively validate proper operation of the system project 302 across all platforms (control programming, visualization configuration, drawings, device configurations, etc.).

In some embodiments, project testing component 210 can also be configured to generate a validation checklist based on analysis of the system project 302, and output this validation checklist via the user interface component 204. This validation checklist can provide instructions regarding on-site tests and checks that should be performed in connection with commissioning the automation system for which system project 302 is being developed. These may comprise tests that should be performed on the automation system hardware and electrical connections that cannot be performed via testing of the system project 302 alone. Example validation checklist may include lists of I/O points whose connectivity should be verified, instructions to visually inspect panel-mounted equipment, sequences of manual operator panel interactions that should be performed to verify proper machine operation, or other such information.

Figure 10:
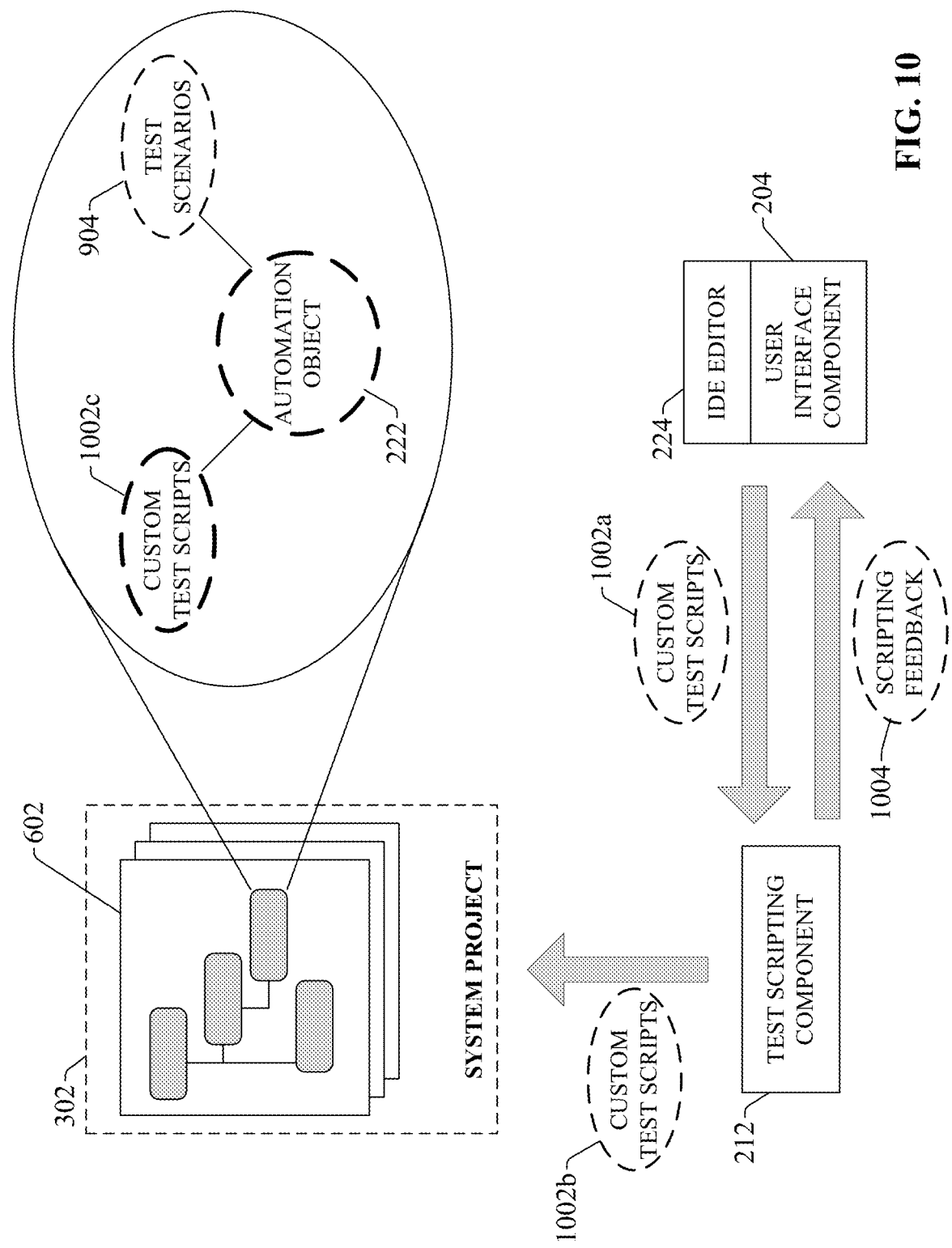
FIG. 10 is a diagram illustrating creation of custom test scripts for validating a system project.

Some embodiments of IDE system 202 can allow end users to develop and run their own custom test scripts on projects 302 developed on the IDE system 202. FIG. 10 is a diagram illustrating creation of custom test scripts 1002 for validating a system project 302. In this example, a user can submit custom test scripts 1006 to the IDE system 202 and associate these test scripts with selected automation objects 222. During development of the custom test scripts 1002, test scripting component 212 can render (via user interface component 204) scripting feedback 1004 to guide the user through the custom scripting process. This feedback 1004 can include, for example, test script formatting recommendations, recommendations regarding which aspects of the system project 302 should be tested based on an inferred type of industrial application or industrial vertical for which the project 302 is being developed, or other such feedback. Upon completion of the custom test script 1002, test scripting component 212 can supplement or replace existing test scripts associated with the selected automation object with the custom test script 1002 submitted by the user. As an alternative to associating the custom script 1002 with an automation object 222, custom test script 1002 may be associated with a code segment or module defined within the system project 302, such that the test script 1002 is executed whenever the associated code segment is modified to verify that the modifications have not invalidated portions of the system project 302.

Figure 11:
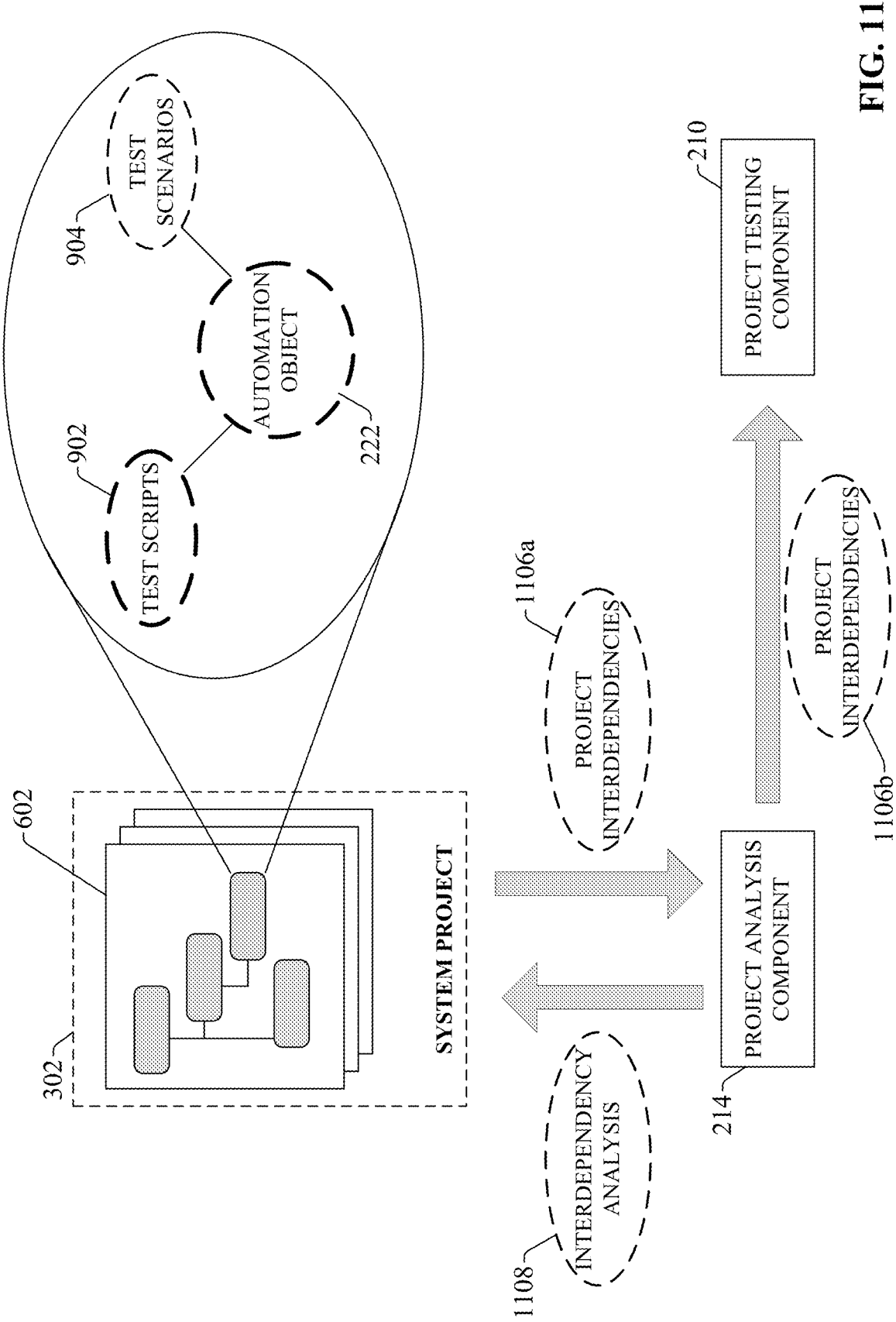
FIG. 11 is a diagram illustrating project interdependency analysis performed by an IDE system.

Often, changes to industrial control code that has already been tested may cause unforeseen changes in the operation of other parts of the code affected by the change. Conventionally, modifications to control code must be manually retested since developers may not be sure of which other parts of the code will be impacted by a modification. This often discourages designers from making changes to a control project after testing, given the amount of re-testing required. In contrast to this approach, since execution of test scripts 902 are part of an integrated testing framework supported by the IDE system 202 described herein, subsequent modifications to the system project 302 can invoke execution of appropriate pre-defined test scripts 902 on portions of the system project 302 known to be affected by the modifications. FIG. 11 is a diagram illustrating project interdependency analysis performed by the IDE system 202. In some embodiments, IDE system 202 can include a project analysis component 214 that executes interdependency analysis 1108 on a completed or in-development system project 302. This analysis 1108 identifies project interdependencies 1106 across the system project 302, including but not limited to programmatic relationships or dependencies between control code segments or routines, dependencies between control code segments and visualization elements, dependencies between control code and engineering drawings (e.g., I/O drawings, electrical drawings, panel layout drawings, etc.), or other such relationships. In some embodiments, project analysis component 214 can learn these interdependencies 1106 by executing an interdependency crawler that performs regression analysis to learn interdependencies between code segments and/or other elements of the system project 302. Project analysis component 214 can also identify hierarchical relationships between automation objects and/or control code routines or modules defined by the project data model 602. These hierarchical relationships may be used by the project testing component 210 to determine which portions of the control code should be re-tested in response to a change to one of the portions. Project analysis component 214 can then train project testing component 210 with these learned project interdependencies 1106 for the purpose of subsequent project validations.

For example, as noted above, the IDE system 202 can support association of validated test scripts 902 with respective automation objects 222 or respective portions of control code. If a portion of the system project's control code is changed by a developer, project testing component 210 can identify which parts of the system project 302 need to be re-tested based on knowledge of which other aspects of the system project 302 may be affected by the modification, as determined based on the learned project interdependencies 1106. Based on these interdependencies, project testing component 210 will re-execute the appropriate test scripts 902 in order to re-verify portions of the system project 302 that may have been affected by the modification. In this way, the IDE system 202 can determine how much re-testing is required to validate a given modification to the system project 302.

Figure 12:
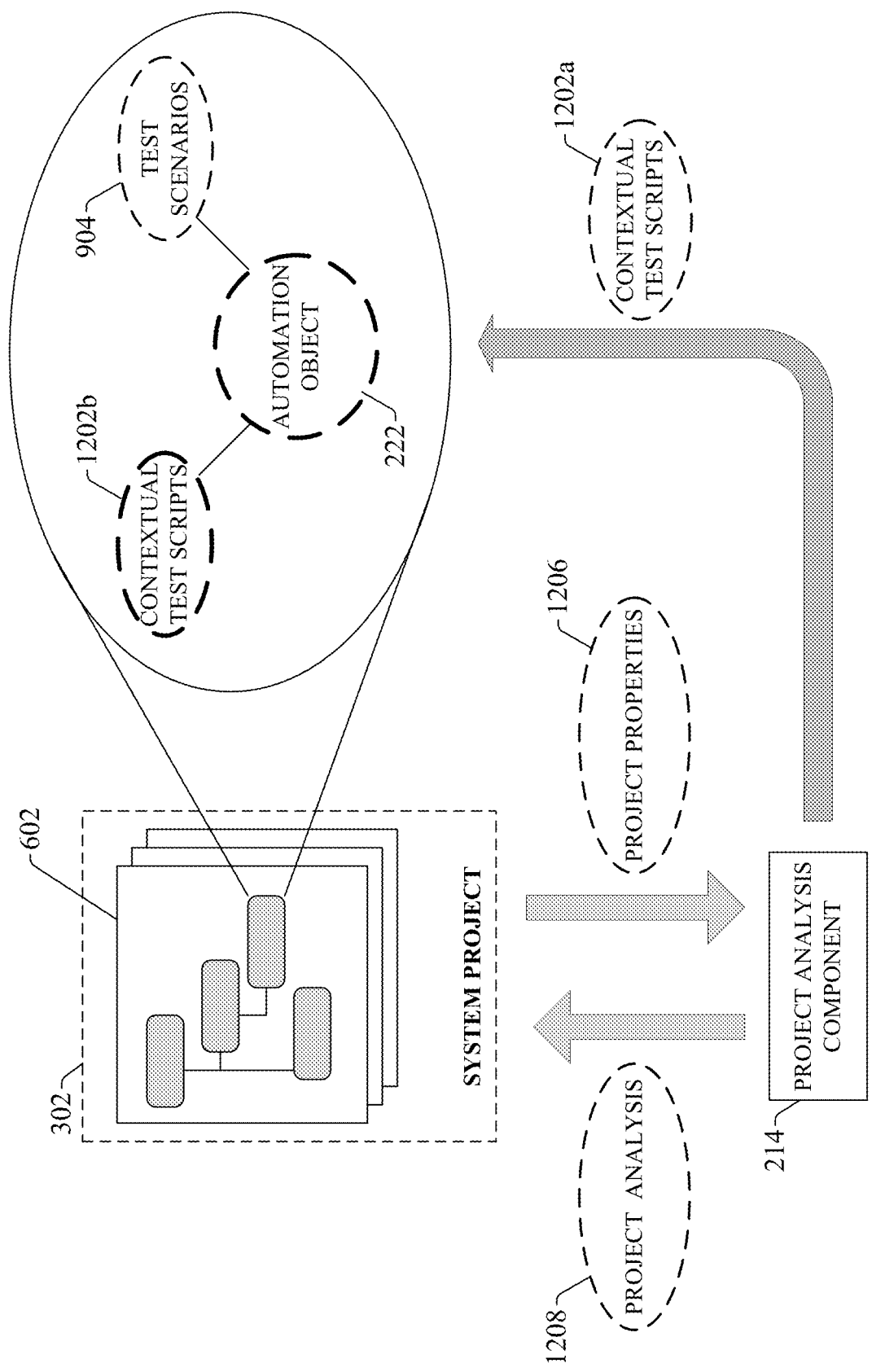
FIG. 12 is a diagram illustrating generation of context-based test scripts based on an analysis of a system project's properties.

In some embodiments, industrial IDE system 202 can also support context-based testing. FIG. 12 is a diagram illustrating generation of context-based test scripts 1202 based on an analysis of the system project's properties. According to this approach, project analysis component 214 performs an analysis 1208 on a system project 302 to determine one or more properties of the project 1206 and self-generates validation and verification routines in the form of contextual test scripts 1202 to be executed against the system project 302 based on these properties 1206. For example, project analysis component 214 may generate a contextual test script 1202 based on an inference of the type of automation system or project for which system project 302 is being developed. In this regard, project testing component 210 may infer the type of automation system or application based on recognition of certain types of control programming, code modules 508, or visualizations 510 used in the project 302. Based on this knowledge of the type of automation system or application, the project testing component 210 can leverage encoded industrial expertise to generate a suitable set of application-specific contextual test scripts 1202, which can be run against the system project 302 by project testing component 210. These contextual test scripts 1202 can be generated based on pre-programmed knowledge of which system aspects should be verified given the type of automation project being designed.

In some embodiments, the project analysis component 214 may also identify an industrial vertical to which the system project 302 relates (e.g., automotive, oil and gas, food and drug, etc.), and generate contextual test scripts 1202 based on the identified vertical. In this regard, it may be known that certain industrial verticals mandate particular testing methodologies in connection with validating industrial control programming or other aspects of a system project, and these testing methodologies can be implemented by contextual test scripts 1202 generated by the project analysis component 214 as a function of the identified vertical.

FIGS. 13-16 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 13:
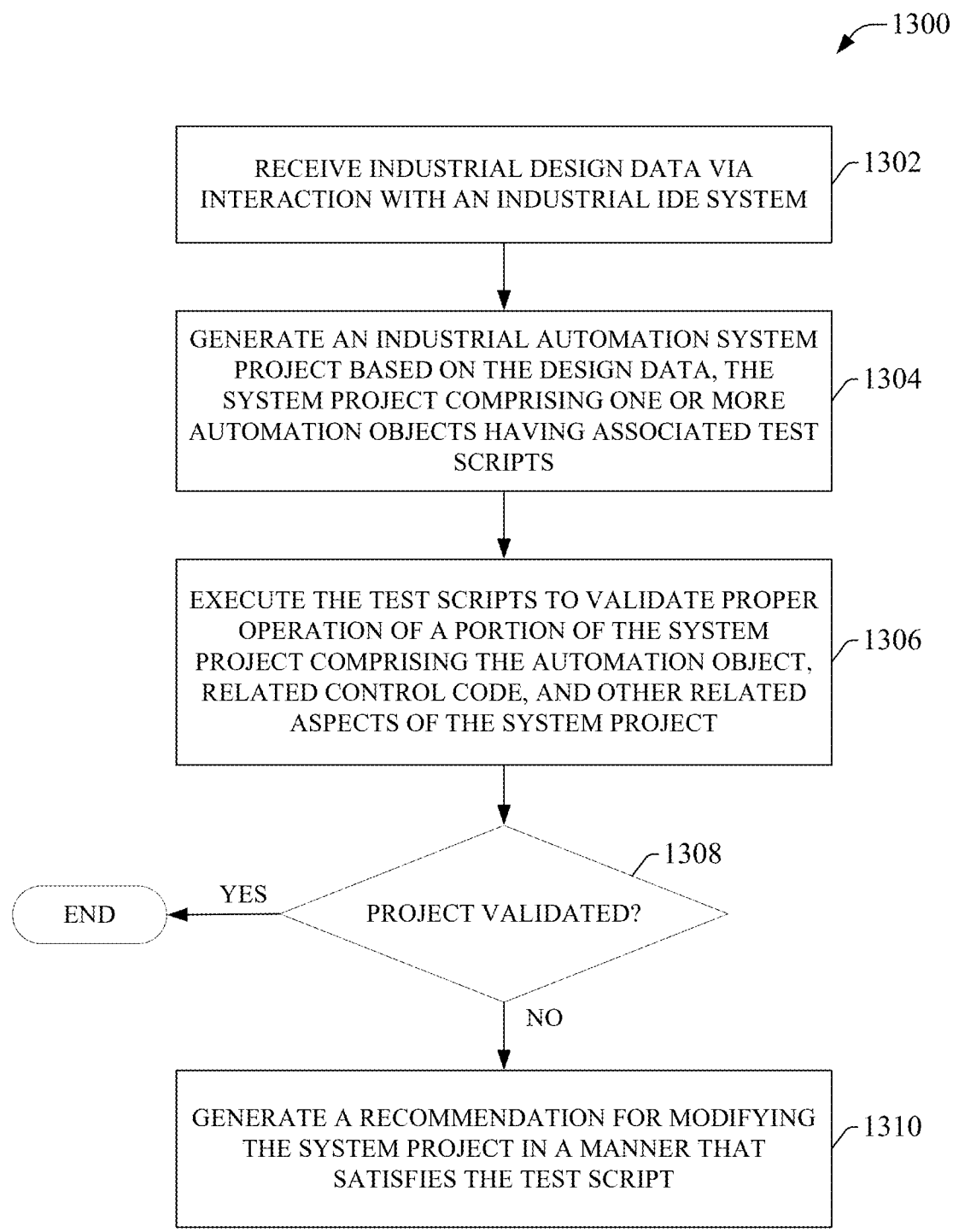
FIG. 13 is a flowchart of an example methodology for validating an industrial automation system project.

FIG. 13 illustrates an example methodology 1300 for validating an industrial automation system project. Initially at 1302, industrial design data is received via interaction with an industrial IDE system. The industrial design data can be submitted in the form of one or more of industrial controller programming (e.g., ladder logic, sequential function charts, scripted control code such as an industrial DSL, etc.), HMI screen development input, industrial device or equipment selections, engineering drawing input, etc. In some embodiments, the industrial design data can also include completed engineering drawings (e.g., P&ID drawings, electrical drawings, mechanical drawings, etc.), which can be parsed and analyzed by the industrial IDE to identify components of the industrial automation system being designed (e.g., industrial devices, machines, equipment, conduit, piping, etc.) as well as functional and physical relationships between these components.

Design data can also comprise images or video in some embodiments. For example, an image or video of an installation site at which the industrial automation system being designed is to be installed can be submitted to the industrial IDE, which can analyze the image or video to identify physical elements within the installation area (e.g., walls, girders, safety fences, existing machines and devices, etc.) and physical relationships between these elements (e.g., distances between machines or other physical elements, lengths of piping runs, locations and distances of wiring harnesses or cable trays, etc.). Based on results of this drawing or image/video analysis, the industrial IDE can add components to engineering schematics, generate control programming or visualizations for components identified in the drawings or images, generate suitable device parameter settings, generate recommendations regarding optimal locations for devices or machines, etc.

For embodiments of the industrial IDE that support goal-based programming, the design data can also comprise an indication of a desired design goal and associated design constraints; e.g., in terms of a required product or material output rate, a maximum total energy consumption rate, constraints on installation space (which may be obtained based on images or video of the installation site, as described above), or other such parameters. Based on these design goals and constraints, the industrial IDE can generate at least a portion of the automation system project, including one or more of equipment or device selections, control code, drawings, visualizations, or device parameters capable of satisfying the specified design goals in view of the specified constraints.

At 1304, an industrial automation system project is generated based on the design data received at step 1302. The system project comprises one or more automation objects having associated test scripts for validating the automation object and portions of the control programming that reference, or are otherwise associated with, the automation object. The system project comprises one or more executable files that can be deployed and executed on at least one of an industrial control device (e.g., a PLC or another type of industrial control device), a human-machine interface terminal, or another type of industrial device. These files can include, for example, industrial control programming files, visualization application files, device configuration files, or other such executable or configuration components. The system project can also comprise other engineering documents generated by the IDE system based on the design input, including but not limited to engineering drawings (e.g., I/O drawings, electrical drawings, P&ID drawings, etc.), bills of materials, installation instructions, or other such documents.

The automation objects are building blocks for the industrial automation system project and represent various types of real-world industrial assets or processes, including but not limited to pumps, tanks, values, motors, motor drives (e.g., variable frequency drives), industrial robots, actuators (e.g., pneumatic or hydraulic actuators), or other such assets. The automation objects are associated with various attributes or properties as a function of their represented asset or process, including one or more tests scripts that define a testing routine for validating the control programming within which the automation object is used. The test script can define the testing routing in terms of a sequencing of simulated inputs to be fed to the automation object and/or its associated control code, and expected responses of the code to the simulated inputs. In some embodiments, the automation objects may be configured to dynamically modify their associated test scripts based on the programmatic context within which the automation objects are used (e.g., the type of automation application for which the system project is being developed, an industrial vertical within which the system project is to be used, an industrial function being carried out by the portion of the control code within which the automation object is used, etc.).

At 1306, the test scripts are executed to validate proper operation of a portion of the system project that comprises the automation object, as well as related control code and other portions of the system project (e.g., visualization applications, engineering drawings, etc.) that reference this portion of the system project. At 1308, a determination is made as to whether the project is validated based on the response to of the system project to execution of the test scripts. If the project is validated (YES at step 1308), the methodology ends. Alternatively, if the project is not validated (NO at step 1308), the project proceeds to step 1310, where a recommendation for modifying the system project in a manner that will satisfy the test script is recommended. This recommendation may comprise, for example, a recommended control code modification or replacement, recommended corrections to data tag addresses, recommended corrections to HMI graphical object references, recommended correction to mechanical or electrical drawings for consistency with the control code, recommended modifications of an industrial device's configuration parameters, or other such corrections. In addition or as an alternative to generating a recommendations, the corrections may be automatically implemented in the system project at step 1310.

Figure 14:
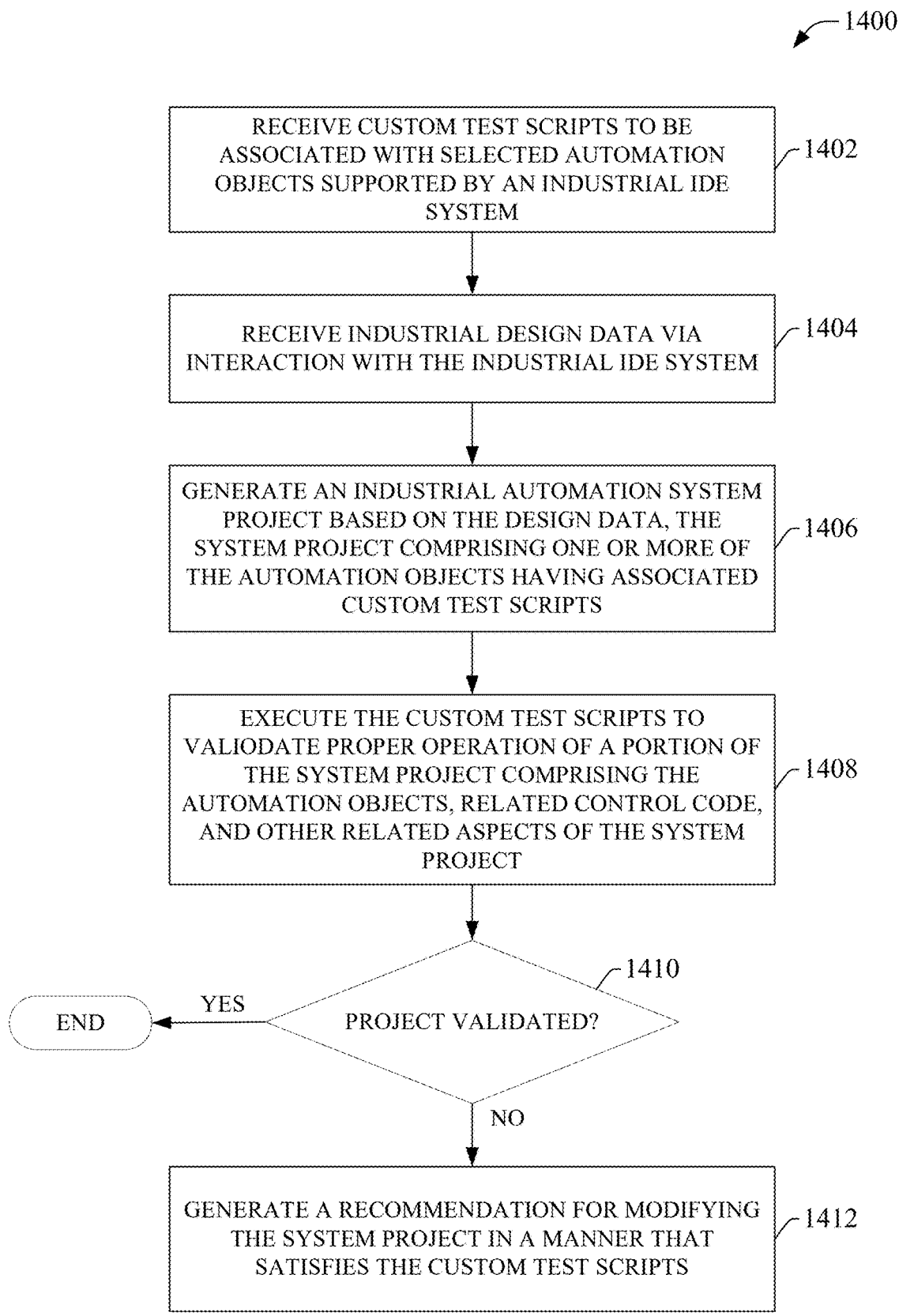
FIG. 14 is a flowchart of an example methodology for customizing and executing test scrips for validating an industrial control system project.

FIG. 14 illustrates an example methodology 1400 for customizing and executing test scrips for validating an industrial control system project. At 1402, custom test scripts to be associated with selected automation objects supported by an industrial IDE system are received. At 1404, industrial design data is received via interaction with the industrial IDE system. At 1406, an industrial automation system project is generated based on the design data received at step 1404. The system project comprises one or more of the automation objects having associated test scripts defined at step 1404. Steps 1404 and 1406 may be similar to steps 1302 and 1304, respectively, of methodology 1300.

At 1408, the custom test scripts are executed to validate proper operation of a portion of the system project comprising the automation object, as well as related portions of control code and other aspects of the system project that reference the automation object. At 1410, a determination is made as to whether the project is verified based on the response of the system project to execution of the custom test scripts. If the project is verified (YES at step 1410), the methodology ends. Alternatively, if the project is not validated (NO at step 1410), the methodology proceeds to step 1412, where a recommendation for modifying the system project in a manner that satisfies the custom test scripts is generated. Alternatively or in addition, the recommendations may be automatically implemented by the IDE system. Step 1412 can be similar to step 1310 of methodology 1300.

Figure 15A:
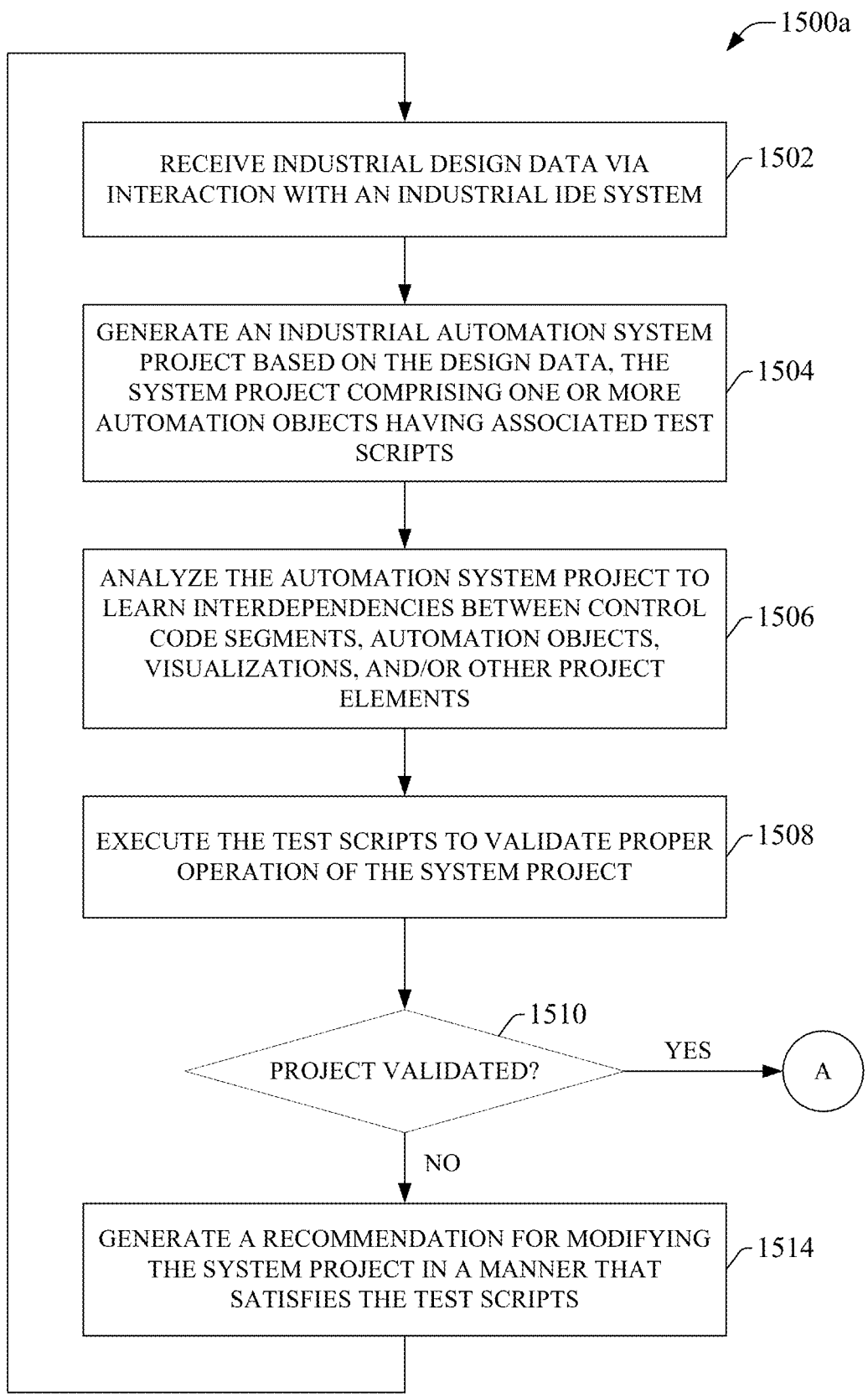
FIG. 15a is a flowchart of a first part of an example methodology for generating and executing context-based test scripts for an industrial automation system project.

FIG. 15*a* illustrates a first part of an example methodology 1500*a* for generating and executing context-based test scripts for an industrial automation system project. Initially, at 1500*a*, industrial design data is received via interaction with an industrial IDE system. At 1504, an industrial automation system project is generated based on the design data received at step 1504. The system project comprises one or more automation objects having associated test scripts. Steps 1502 and 1504 can be similar to steps 1302 and 1304, respectively, of methodology 1300.

At 1506, the automation system project generated at step 1504 is analyzed to learn interdependencies between control code segments, automation objects, visualizations, and/or other project elements defined in the system project. The analysis carried out at step 1506 may be, for example, a regression analysis that identifies which system elements (e.g., control code segments, HMI visualization objects, automation objects, engineering drawing elements) determine behaviors or states of other system elements.

At 1508, the test scripts are executed to validate proper operation of the system project. At 1510, a determination is made as to whether the project is validated based on the response of the system project to execution of the test scripts at step 1508. If the project is not validated (NO at step 1510), the methodology proceeds to step 1510, where a recommendation for modifying the system project in a manner that satisfies the test scripts is generated. Step 1514 can be similar to step 1310 of methodology 1300. The methodology then returns to step 1502, and steps 1502-1510 are repeated until the project is validated at step 1510.

Figure 15B:
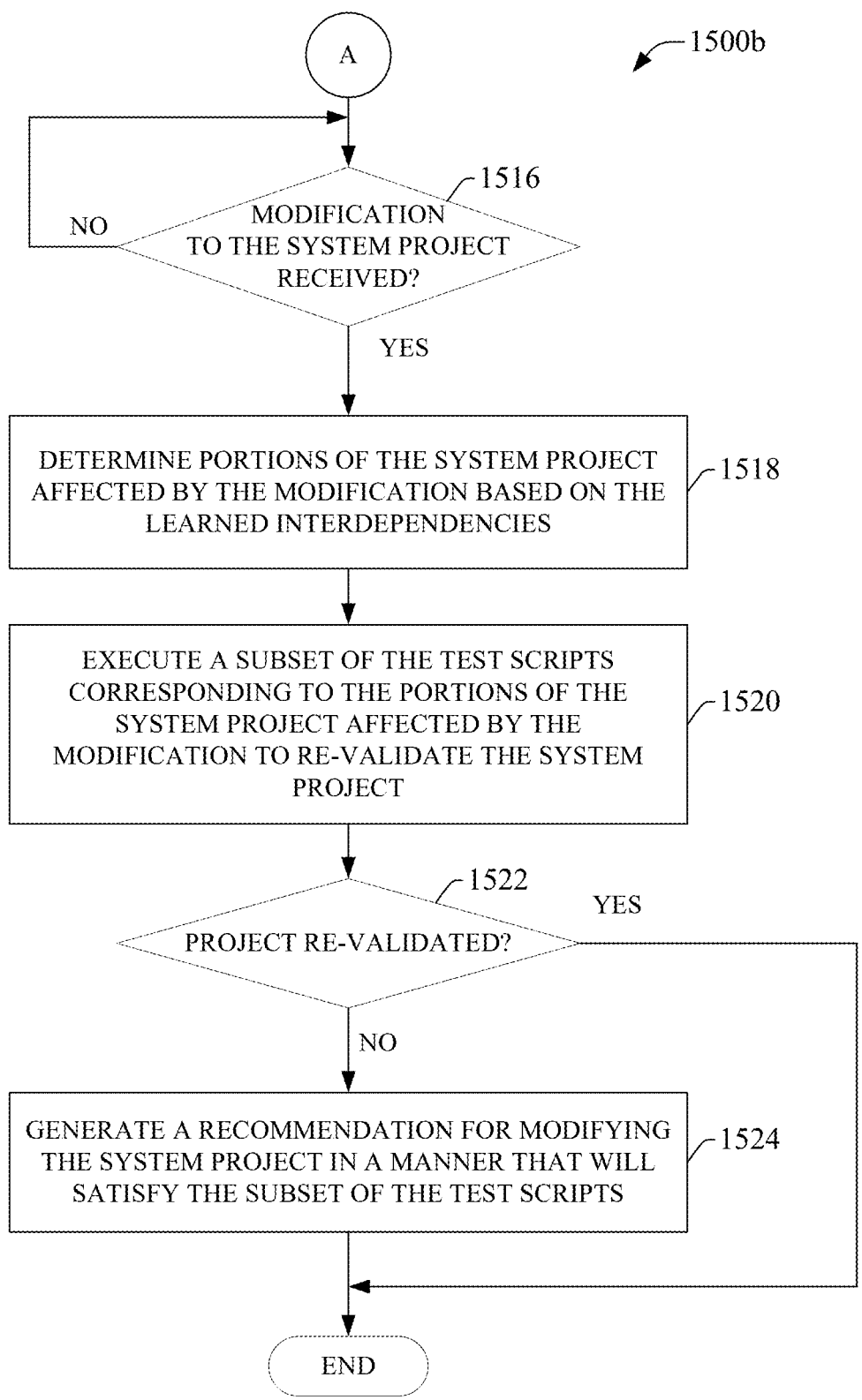
FIG. 15b is a flowchart of a second part of the example methodology for generating and executing context-based test scripts for an industrial automation system project.

When the project has been validated (YES at step 1510), the methodology proceeds to the second part 1500*b* illustrated in FIG. 15*b*. At 1516, a determination is made as to whether a modification to the validated system project is received. If such a modification is received (YES at step 1516), the methodology proceeds to step 1518, where portions of the system project that are affected by the modification are determined based on the interdependencies learned at step 1506. For example, if a particular code segment is modified, the learned interdependencies are referenced to determine what other portions of the control code—as well as other elements of the system project— reference the code segment and may therefore be affected by the modification. At 1520, a subset of the test scripts corresponding to the portions of the system project determined at step 1518 to be affected by the modification are executed to re-validate the system project. At 1522, a determination is made as to whether the project is re-validated based on the system response to the test scripts executed at step 1520. If the project is not re-validated (NO at step 1522), the methodology proceeds to step 1524, where another recommendation for modifying the system project in a manner that satisfies the subset of the test scripts is generated. Alternatively or in addition, the recommended modification may be automatically implemented by the industrial IDE system at step 1524. If the project is re-validated based by the subset of the test scripts (YES at step 1522), the methodology ends.

Figure 16:
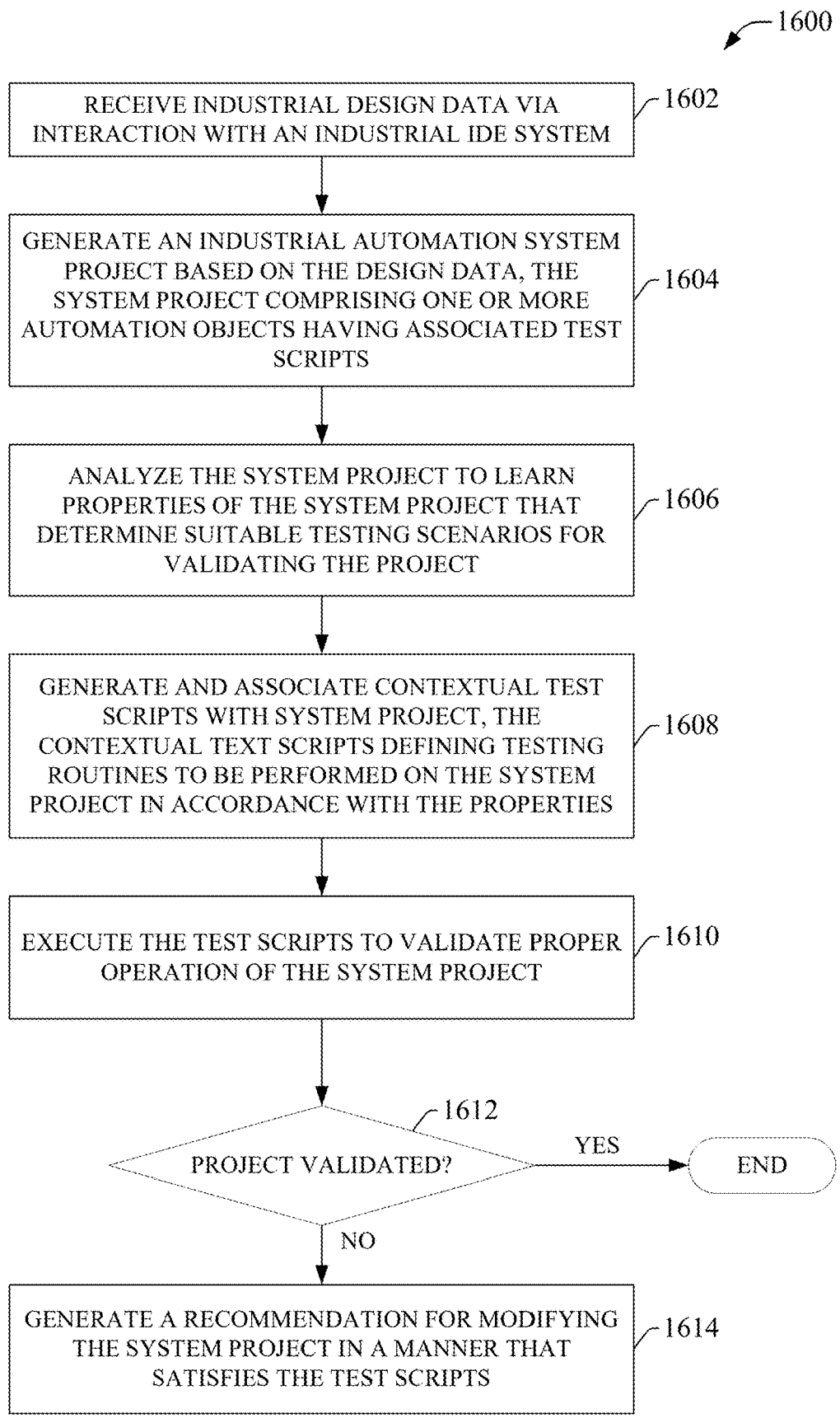
FIG. 16 is a flowchart of an example methodology for generating and executing context-based test scripts for an industrial automation system project.

FIG. 16 illustrates an example methodology 1600 for generating and executing context-based test scripts for an industrial automation system project. Initially, at 1602, industrial design data is received via interaction with an industrial IDE system. At 1604, an industrial automation system project is generated based on the design data received at step 1602. The system project comprises one or more automation objects having associated test scripts. Steps 1602 and 1604 may be similar to steps 1302 and 1304, respectively, of methodology 1300.

At 1606, the system project generated at step 1604 is analyzed to learn properties of the system project that determine suitable testing scenarios for validating the project. Such properties may include, for example, the type of automation system or application for which the system project is being developed, which may be determined based on recognition of certain types of control programming, code modules, or visualizations used in the project.

At 1608, contextual test scripts are generated and associated with the system project, where the contextual test scripts define testing routines to be performed on the system project in accordance with the properties discovered at step 1606. At 1610, the test scripts generated at step 1608 are executed to validate operation of the system project. At 1612, a determination is made as to whether the project is validated based on execution of the test scrips at step 1610. If the project is not validated (NO at step 1612), the methodology proceeds to step 1614, where a recommendation for modifying the system project in a manner that satisfies the test scrips is generated. Alternatively or in addition, the IDE system can automatically implement the recommendations in the system project at step 1614. If the project is validated at step 1612 (YES at step 1612), the methodology ends.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 17:
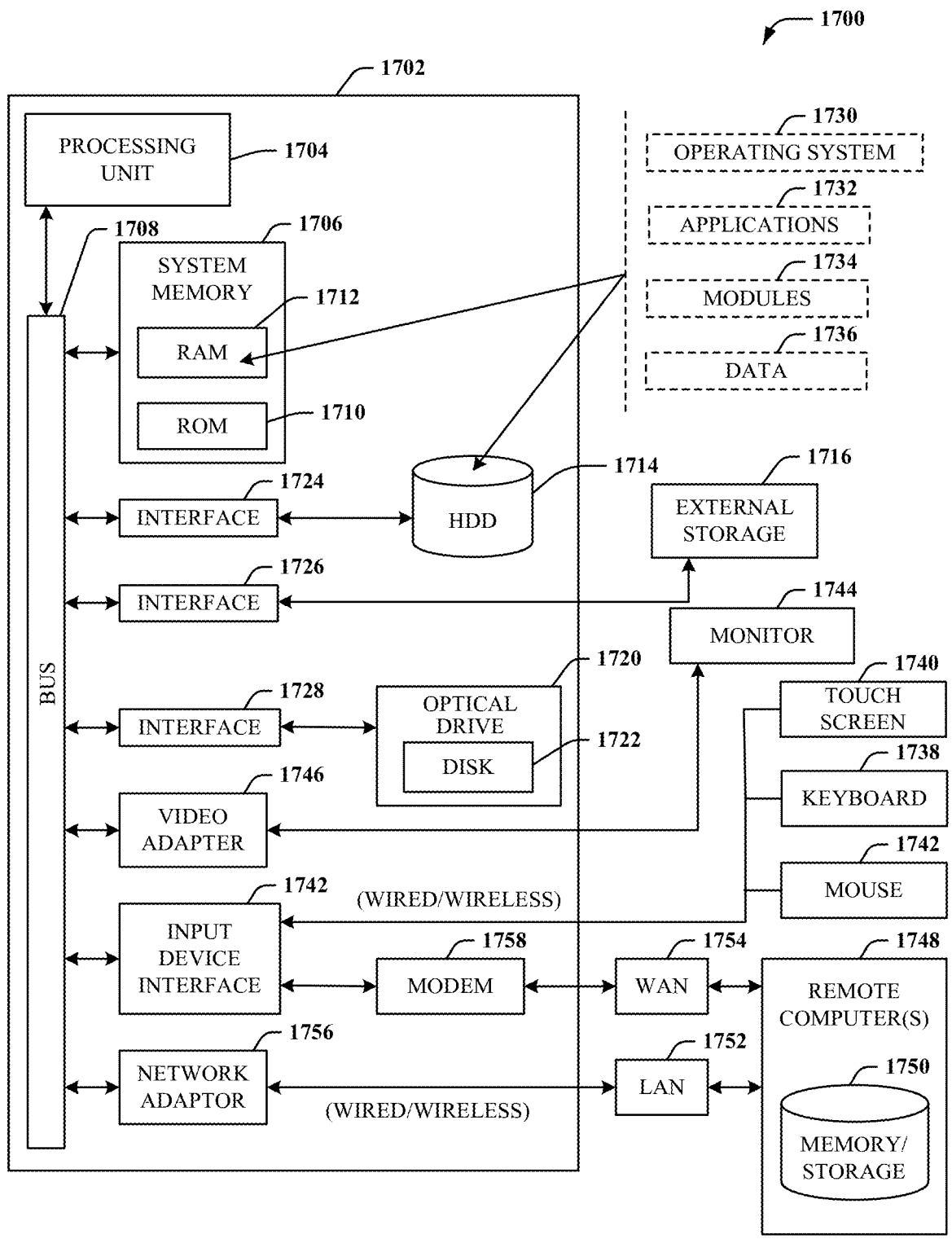
FIG. 17 is an example computing environment.
Figure 18:
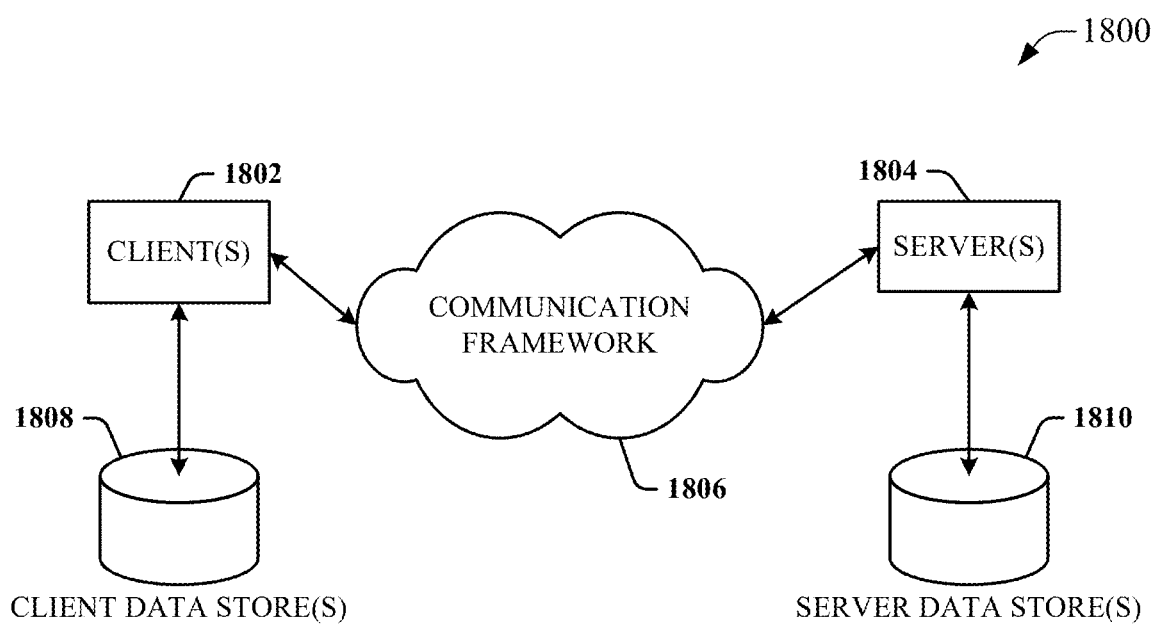
FIG. 18 is an example networking environment.

In order to provide a context for the various aspects of the disclosed subject matter, FIGS. 17 and 18 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for application programs 1732. Runtime environments are consistent execution environments that allow application programs 1732 to run on any operating system that includes the runtime environment. Similarly, operating system 1730 can support containers, and application programs 1732 can be in the form of containers, which are lightweight, standalone, executable packages of software that include, e.g., code, runtime, system tools, system libraries and settings for an application.

Further, computer 1702 can be enable with a security module, such as a trusted processing module (TPM). For instance with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1744 or other type of display device can be also connected to the system bus 1708 via an interface, such as a video adapter 1746. In addition to the monitor 1744, a computer typically includes other peripheral output devices (not shown), such as speakers, printers, etc.

The computer 1702 can operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1752 through a wired and/or wireless communication network interface or adapter 1756. The adapter 1756 can facilitate wired or wireless communication to the LAN 1752, which can also include a wireless access point (AP) disposed thereon for communicating with the adapter 1756 in a wireless mode.

When used in a WAN networking environment, the computer 1702 can include a modem 1758 or can be connected to a communications server on the WAN 1754 via other means for establishing communications over the WAN 1754, such as by way of the Internet. The modem 1758, which can be internal or external and a wired or wireless device, can be connected to the system bus 1708 via the input device interface 1742. In a networked environment, program modules depicted relative to the computer 1702 or portions thereof, can be stored in the remote memory/storage device 1750. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1752 or WAN 1754 e.g., by the adapter 1756 or modem 1758, respectively. Upon connecting the computer 1702 to an associated cloud storage system, the external storage interface 1726 can, with the aid of the adapter 1756 and/or modem 1758, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 18 is a schematic block diagram of a sample computing environment 1800 with which the disclosed subject matter can interact. The sample computing environment 1800 includes one or more client(s) 1802. The client(s) 1802 can be hardware and/or software (e.g., threads, processes, computing devices). The sample computing environment 1800 also includes one or more server(s) 1804. The server(s) 1804 can also be hardware and/or software (e.g., threads, processes, computing devices). The servers 1804 can house threads to perform transformations by employing one or more embodiments as described herein, for example. One possible communication between a client 1802 and servers 1804 can be in the form of a data packet adapted to be transmitted between two or more computer processes. The sample computing environment 1800 includes a communication framework 1806 that can be employed to facilitate communications between the client(s) 1802 and the server(s) 1804. The client(s) 1802 are operably connected to one or more client data store(s) 1808 that can be employed to store information local to the client(s) 1802. Similarly, the server(s) 1804 are operably connected to one or more server data store(s) 1810 that can be employed to store information local to the servers 1804.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for developing industrial applications, comprising:
    a memory that stores executable components; and
    a processor, operatively coupled to the memory, that executes the executable components, the executable components comprising:
        a user interface component configured to render integrated development environment (IDE) interfaces and to receive, via interaction with the IDE interfaces, design input that defines aspects of an industrial automation project; and
        a project generation component configured to generate system project data based on the design input, wherein the system project data comprises at least one automation object that represents an industrial asset, the at least one automation object comprising at least control code designed to control the industrial asset and a test script designed to validate a portion of the system project data that references the at least one automation object,
        wherein the user interface component is further configured to, in response determining, based on execution of the test script, that one or more aspects of the system project data are not validated by the test script, render a recommendation for modifying the industrial automation project in a manner that satisfies the test script.

2. The system of claim 1, wherein
the system project data comprises at least an executable industrial control program, and
the recommendation comprises at least one of a recommended modification to the industrial control program, a recommended replacement of a portion of the industrial control program with different control code, or a recommended correction to a data tag address.

3. The system of claim 1, wherein
the system project data comprises at least an industrial visualization application, and
the recommendation comprises at least a recommended correction to a graphical object reference defined in the industrial visualization application.

4. The system of claim 1, wherein
the system project data comprises at least an executable industrial control program and engineering drawings for the industrial automation project, and
the recommendation comprises a recommended correction to one or more of the engineering drawings to bring the one or more of the engineering drawings into consistency with the industrial control program.

5. The system of claim 1, wherein
the system project data comprises at least industrial device configuration data, and
the recommendation comprises a recommended modification to one or more device configuration parameters defined by the industrial device configuration data.

6. The system of claim 1, wherein the executable components further comprise a project testing component configured to execute the test script to facilitate validation of the portion of the system project data.

7. The system of claim 6, wherein the test script defines a sequence of simulated inputs to be injected into the system project data by the project testing component and an expected response of the system project data to the simulated inputs.

8. The system of claim 6, wherein the at least one automation object further defines multiple test scenarios to be executed by the project testing component to facilitate the validation of the system project data.

9. The system of claim 6, wherein
the executable components further comprise a project analysis component configured to analyze the system project data to identify interdependencies between elements of the system project data, and
the project testing component is further configured to, in response to receipt of new design input that implements a modification to a portion of the system project data, determine a subset of the system project data affected by the modification based on the interdependencies, and
execute test scripts associated with the subset of the system project data.

10. The system of claim 9, wherein the elements of the system project comprise at least one of control code segments, visualization objects, engineering drawing elements, or device configuration parameters.

11. A method for developing industrial applications, comprising:
rendering, by a system comprising a processor, integrated development environment (IDE) interfaces on a client device;
receiving, by the system via interaction with the IDE interfaces, design input that defines aspects of an industrial control and monitoring project;
generating, by the system, system project data based on the design input, the system project data comprising at least one automation object that represents an industrial asset, the at least one automation object comprising at least control code designed to control the industrial asset and a test script designed to validate a portion of the system project data that references the at least one automation object; and
in response determining, based on execution of the test script, that one or more aspects of the system project data are not validated by the test script, displaying, by the system on the client device, a recommendation for modifying the industrial control and monitoring project in a manner that satisfies the test script.

12. The method of claim 11, wherein
the generating the system project data comprises generating at least an executable industrial control program, and
the displaying the recommendation comprises displaying at least one of a recommended modification to the industrial control program, a recommended replacement of a portion of the industrial control program with different control code, or a recommended correction to a data tag address.

13. The method of claim 11, wherein
the generating the system project data comprises generating at least an industrial visualization application, and
the displaying the recommendation comprises displaying at least a recommended correction to a graphical object reference defined in the industrial visualization application.

14. The method of claim 11, wherein
the generating the system project data comprises generating at least an executable industrial control program and engineering drawings for the industrial automation project, and
the displaying the recommendation comprises displaying at least a recommended correction to one or more of the engineering drawings to bring the one or more of the engineering drawings into consistency with the industrial control program.

15. The method of claim 11, wherein
the generating the system project data comprises generating at least industrial device configuration data, and
the displaying the recommendation comprises displaying a recommended modification to one or more device configuration parameters defined by the industrial device configuration data.

16. The method of claim 11, wherein the test script defines a sequence of simulated inputs to be injected into the system project data and an expected response of the system project data to the simulated inputs.

17. The method of claim 11, wherein the at least one automation object further defines multiple test scenarios to be executed to validate the system project data.

18. The method of claim 11, further comprising:
analyzing, by the system, the system project data to identify interdependencies between elements of the system project data; and
in response to receiving new design input that implements a modification to a portion of the system project data:
determining, by the system, a subset of the system project data affected by the modification based on the interdependencies, and
executing test scripts associated with the subset of the system project data.

19. A non-transitory computer-readable medium having stored thereon instructions that, in response to execution, cause a system comprising a processor to perform operations, the operations comprising:
rendering integrated development environment (IDE) interfaces on a client device;
receiving, from the client device via interaction with the IDE interfaces, design input that defines control design aspects of an industrial automation project;
generating system project data based on the design input, wherein the system project data comprises an automation object that represents an industrial asset and that comprises at least control code designed to control the industrial asset and a test script designed to validate a portion of the system project data that references the automation object; and
in response determining, based on execution of the test script, that one or more aspects of the system project data are not validated by the test script, rendering, on the client device, a recommendation for modifying the industrial automation project in a manner that satisfies the test script.

20. The non-transitory computer-readable medium of claim 19, wherein
the generating the system project data comprises generating at least an executable industrial control program, and
the rendering the recommendation comprises rendering at least one of a recommended modification to the industrial control program, a recommended replacement of a portion of the industrial control program with different control code, or a recommended correction to a data tag address.

\* \* \* \* \*